(12) United States Patent
Nakamura et al.

(10) Patent No.: US 12,087,135 B2
(45) Date of Patent: Sep. 10, 2024

(54) INFORMATION PROCESSING SYSTEM, INFORMATION PROCESSING METHOD, AND NON-TRANSITORY COMPUTER READABLE MEDIUM

(71) Applicant: CYGAMES, INC., Tokyo (JP)

(72) Inventors: Takatoshi Nakamura, Tokyo (JP); Yuki Okabe, Tokyo (JP); Takashi Ueno, Tokyo (JP); Takafumi Goto, Tokyo (JP); Kensuke Nakata, Tokyo (JP)

(73) Assignee: CYGAMES, INC., Tokyo (JP)

(*) Notice: Subject to any disclaimer, the term of this patent is extended or adjusted under 35 U.S.C. 154(b) by 108 days.

(21) Appl. No.: 17/683,841

(22) Filed: Mar. 1, 2022

(65) Prior Publication Data
US 2022/0180707 A1 Jun. 9, 2022

Related U.S. Application Data

(63) Continuation of application No. PCT/JP2020/032853, filed on Aug. 31, 2020.

(30) Foreign Application Priority Data

Sep. 3, 2019 (JP) .................................. 2019-160156

(51) Int. Cl.
*G07F 17/32* (2006.01)
*A63F 13/00* (2014.01)

(52) U.S. Cl.
CPC ...... *G07F 17/3269* (2013.01); *G07F 17/3262* (2013.01); *G07F 17/329* (2013.01); *G07F 17/3293* (2013.01)

(58) Field of Classification Search
CPC .......... A63F 13/58; A63F 13/69; A63F 13/79; A63F 13/795; A63F 13/822; A63F 13/95;
(Continued)

(56) References Cited

U.S. PATENT DOCUMENTS 6,623,010 B1* 9/2003 Holland, Jr. ............... A63F 1/02
273/306
6,736,724 B1* 5/2004 Erikawa .................. A63F 13/10
463/32
8,708,817 B1* 4/2014 de la Carcova ........ A63F 13/92
463/19
(Continued)

FOREIGN PATENT DOCUMENTS

JP 2018-000995 A 1/2018

OTHER PUBLICATIONS

International Search Report issued in PCT/JP2020/032853 on Oct. 6, 2020 (7 pages).

*Primary Examiner* — Milap Shah
(74) *Attorney, Agent, or Firm* — Osha Bergman Watanabe & Burton LLP

(57) ABSTRACT

An information processing system is configured to execute: storing game media possessed by a player; storing, in a preliminary period, first group information for identifying game media corresponding to a first game condition in a first storage area and second group information for identifying game media corresponding to a second game condition in a second storage area; storing, in a post period, the second group information in the first storage area; enabling, in the preliminary period, the execution of games using the first and second group information; enabling, in the post period, the execution of a game using the second group information stored in the first storage area and disabling the execution of a game using the first group information; and storing, in the first storage area in the post period, the second group information stored in the second storage area in the preliminary period.

4 Claims, 55 Drawing Sheets

(58) Field of Classification Search
CPC .......... A63F 1/00; A63F 1/04; A63F 3/00075; A63F 2300/575; G07F 17/3262; G07F 17/3279; G07F 17/3293; G09B 19/22
See application file for complete search history.

(56) References Cited

U.S. PATENT DOCUMENTS

| | | | |
|---|---|---|---|
| 9,474,979 B2* | 10/2016 | Yamaguchi | A63F 13/825 |
| 10,583,362 B2* | 3/2020 | Suzuki | A63F 13/58 |
| 2002/0013168 A1* | 1/2002 | Kameta | A63F 3/00075 |
| | | | 463/11 |
| 2003/0137107 A1* | 7/2003 | Rubin | A63F 1/00 |
| | | | 273/292 |
| 2006/0017229 A1* | 1/2006 | Hayakawa | A63F 1/00 |
| | | | 273/292 |
| 2006/0038349 A1* | 2/2006 | Meeks | A63F 3/00 |
| | | | 273/308 |
| 2006/0202423 A1* | 9/2006 | Tanaka | A63F 1/00 |
| | | | 273/255 |
| 2008/0227512 A1* | 9/2008 | Lang | G07F 17/3293 |
| | | | 463/11 |
| 2011/0275442 A1* | 11/2011 | Hawkins, III | A63F 13/30 |
| | | | 463/42 |
| 2014/0121026 A1* | 5/2014 | Hashimoto | A63F 13/69 |
| | | | 463/42 |
| 2014/0235354 A1* | 8/2014 | Takeuchi | H04L 41/06 |
| | | | 709/223 |
| 2015/0094141 A1* | 4/2015 | Shiratori | A63F 13/822 |
| | | | 463/30 |
| 2015/0182864 A1* | 7/2015 | Wada | A63F 13/35 |
| | | | 463/9 |
| 2020/0023264 A1* | 1/2020 | Chardon | A63F 1/00 |

* cited by examiner

FIG.3B

| DISTRIBUTION PERIOD | DISTRIBUTION STATE | NEWLY PROVIDED CARD CLASSIFICATION | PROVIDED CARD CLASSIFICATIONS |
|---|---|---|---|
| 8th TERM | PRERELEASE STATE | 8th CARD CLASSIFICATION | 1st to 8th CARD CLASSIFICATIONS |
| | MAIN RELEASE STATE | | |
| 9th TERM | PRERELEASE STATE | 9th CARD CLASSIFICATION | 1st to 9th CARD CLASSIFICATIONS |
| | MAIN RELEASE STATE | | |
| 10th TERM | PRERELEASE STATE | 10th CARD CLASSIFICATION | 1st to 10th CARD CLASSIFICATIONS |
| | MAIN RELEASE STATE | | |

FIG.3C

| DISTRIBUTION PERIOD | DISTRIBUTION STATE | FORMAT | | |
|---|---|---|---|---|
| | | ROTATION | PREROTATION | UNLIMITED |
| 8th TERM | PRERELEASE STATE | 3rd to 7th CARD CLASSIFICATIONS | 4th to 8th CARD CLASSIFICATIONS | 1st to 7th CARD CLASSIFICATIONS |
| | MAIN RELEASE STATE | 4th to 8th CARD CLASSIFICATIONS | | 1st to 8th CARD CLASSIFICATIONS |
| 9th TERM | PRERELEASE STATE | 4th to 8th CARD CLASSIFICATIONS | 5th to 9th CARD CLASSIFICATIONS | 1st to 8th CARD CLASSIFICATIONS |
| | MAIN RELEASE STATE | 5th to 9th CARD CLASSIFICATIONS | | 1st to 9th CARD CLASSIFICATIONS |
| 10th TERM | PRERELEASE STATE | 5th to 9th CARD CLASSIFICATIONS | 6th to 10th CARD CLASSIFICATIONS | 1st to 9th CARD CLASSIFICATIONS |
| | MAIN RELEASE STATE | 6th to 10th CARD CLASSIFICATIONS | | 1st to 10th CARD CLASSIFICATIONS |

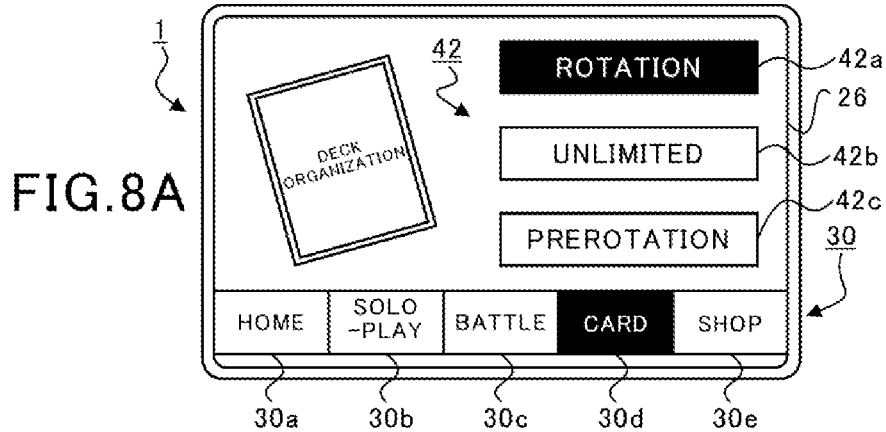

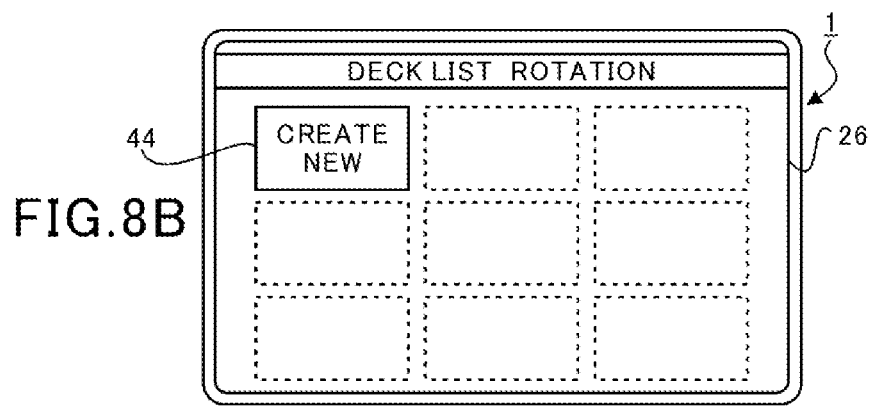

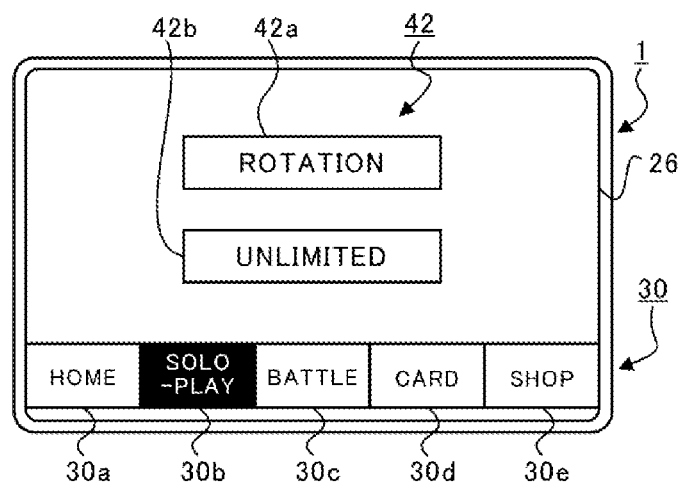

FIG.14A

| CARD ID | CARD CLASSIFICATION ID | NAME | ILLUSTRATION INFORMATION | FUNCTION VALUES | | | | ORGANIZABLE NUMBER |
|---|---|---|---|---|---|---|---|---|
| | | | | CONSUMPTION VALUE | ATTACKING POWER | PHYSICAL POWER | SPECIAL ABILITY | |
| 00001080 | 9 | XXXXXXX | XXXXXXX | 3 | 2 | 2 | XXXXXXX | 3 |
| 00001079 | 9 | XXXXXXX | XXXXXXX | 3 | 2 | 1 | XXXXXXX | 3 |
| 00001078 | 9 | XXXXXXX | XXXXXXX | 2 | 1 | 3 | XXXXXXX | 2 |
| 00001077 | 9 | XXXXXXX | XXXXXXX | 1 | 1 | 1 | XXXXXXX | 2 |
| 00001076 | 9 | XXXXXXX | XXXXXXX | 1 | 2 | 1 | XXXXXXX | 3 |
| 00001075 | 9 | XXXXXXX | XXXXXXX | 2 | 2 | 1 | XXXXXXX | 3 |
| 00001074 | 9 | XXXXXXX | XXXXXXX | 1 | 1 | 2 | XXXXXXX | 2 |
| 00000960 | 8 | XXXXXXX | XXXXXXX | 2 | 2 | 2 | XXXXXXX | 2 |
| 00000959 | 8 | XXXXXXX | XXXXXXX | 2 | 2 | 1 | XXXXXXX | 3 |
| 00000958 | 8 | XXXXXXX | XXXXXXX | 2 | 1 | 3 | XXXXXXX | 2 |

FIG.14B

| CARD ID | CARD CLASSIFICATION ID | NAME | ILLUSTRATION INFORMATION | FUNCTION VALUES ||||  ORGANIZABLE NUMBER |
|---|---|---|---|---|---|---|---|---|
| | | | | CONSUMPTION VALUE | ATTACKING POWER | PHYSICAL POWER | SPECIAL ABILITY | |
| 00001200 | 10 | XXXXXXX | XXXXXXX | 1 | 1 | 1 | XXXXXXX | 3 |
| 00001199 | 10 | XXXXXXX | XXXXXXX | 1 | 1 | 1 | XXXXXXX | 3 |
| 00001198 | 10 | XXXXXXX | XXXXXXX | 1 | 2 | 1 | XXXXXXX | 3 |
| 00001197 | 10 | XXXXXXX | XXXXXXX | 1 | 1 | 2 | XXXXXXX | 2 |
| 00001196 | 10 | XXXXXXX | XXXXXXX | 2 | 2 | 1 | XXXXXXX | 3 |
| 00001195 | 10 | XXXXXXX | XXXXXXX | 2 | 2 | 1 | XXXXXXX | 3 |
| 00001194 | 10 | XXXXXXX | XXXXXXX | 2 | 1 | 2 | XXXXXXX | 2 |
| 00001080 | 9 | XXXXXXX | XXXXXXX | 4 | 2 | 2 | XXXXXXX | 2 |
| 00001079 | 9 | XXXXXXX | XXXXXXX | 4 | 2 | 1 | XXXXXXX | 2 |
| 00001078 | 9 | XXXXXXX | XXXXXXX | 2 | 1 | 3 | XXXXXXX | 2 |

FIG.14C

| CARD ID | CARD CLASSIFICATION ID | NAME | ILLUSTRATION INFORMATION | FUNCTION VALUES ||||  ORGANIZABLE NUMBER |
|---|---|---|---|---|---|---|---|---|
| | | | | CONSUMPTION VALUE | ATTACKING POWER | PHYSICAL POWER | SPECIAL ABILITY | |
| 00001200 | 10 | XXXXXXX | XXXXXXX | 1 | 1 | 1 | XXXXXXX | 3 |
| 00001199 | 10 | XXXXXXX | XXXXXXX | 1 | 1 | 1 | XXXXXXX | 3 |
| 00001198 | 10 | XXXXXXX | XXXXXXX | 1 | 2 | 1 | XXXXXXX | 3 |
| 00001197 | 10 | XXXXXXX | XXXXXXX | 1 | 1 | 2 | XXXXXXX | 2 |
| 00001196 | 10 | XXXXXXX | XXXXXXX | 2 | 2 | 1 | XXXXXXX | 3 |
| 00001195 | 10 | XXXXXXX | XXXXXXX | 2 | 2 | 1 | XXXXXXX | 3 |
| 00001194 | 10 | XXXXXXX | XXXXXXX | 3 | 1 | 2 | XXXXXXX | 2 |
| 00001080 | 9 | XXXXXXX | XXXXXXX | 4 | 2 | 2 | XXXXXXX | 1 |
| 00001079 | 9 | XXXXXXX | XXXXXXX | 3 | 2 | 1 | XXXXXXX | 1 |
| 00001078 | 9 | XXXXXXX | XXXXXXX | 3 | 2 | 3 | XXXXXXX | 2 |

INFORMATION PROCESSING SYSTEM, INFORMATION PROCESSING METHOD, AND NON-TRANSITORY COMPUTER READABLE MEDIUM

CROSS REFERENCE TO RELATED APPLICATIONS

This application is a continuation application of International Application No. PCT/JP2020/032853, filed on Aug. 31, 2020, which claims priority to Japanese Patent Application No. 2019-160156, filed on Sep. 3, 2019, the entire contents of which are incorporated by reference herein.

BACKGROUND ART

Technical Field

The present invention relates to information processing systems, information processing methods, and information processing programs.

As indicated in, for example, PTL 1, there is a conventionally proposed digital card game that allows players to fight a battle against each other by communication. In such a digital card game, the players can acquire cards used in the battle game by executing a lottery, a so-called gacha, for free or with payment.

CITATION LIST

Patent Literature

Patent Literature 1: JP 2018-995 A

SUMMARY OF INVENTION

Technical Problem

In the digital card game, as provided cards are added successively, cards available in the battle game are changed periodically. For this reason, each time the cards available are changed, the players need to organize the cards used in the battle game, which leads to a problem in that the players are required to perform complicated operations.

An object of the present invention is to provide an information processing system, an information processing method, and an information processing program that can enhance the ease of operation performed by a player.

Solution to Problem

In order to solve the above-described problem, an information processing system includes: a game medium storage unit for storing, in a storage section, game media possessed by a player among a plurality of kinds of game media as possessed game media such that the possessed game media are associated with a player ID; a medium group information storage unit that, in a preliminary period before a prescribed time, stores, in a first storage area, first medium group information for identifying a plurality of the game media corresponding to a first game condition and being selected from among the possessed game media on the basis of the player's operation and stores, in a second storage area, second medium group information for identifying a plurality of the game media corresponding to a second game condition different from the first game condition and that, in a post period after the prescribed time, stores the second medium group information in the first storage area on the basis of the player's operation; a game execution unit that, in the preliminary period, enables the execution of a game using the first medium group information stored in the first storage area and a game using the second medium group information stored in the second storage area on the basis of the player's operation and that, in the post period, enables the execution of a game using the second medium group information stored in the first storage area on the basis of the player's operation and disables the execution of a game using the first medium group information; and a transition unit that, in the post period, stores, in the first storage area, the second medium group information stored in the second storage area in the preliminary period on the basis of the player's operation.

In addition, the information processing system may further include: a function information storage section for storing a plurality of items of function information including first function information in which functions implemented by the game media corresponding to at least the first game condition are associated with the respective game media and second function information in which functions implemented by the game media corresponding to at least the second game condition are associated with the respective game media, wherein the game execution unit may proceed with the game on the basis of the function information, and the game media may include a particular game medium that corresponds to both the first game condition and the second game condition and that is associated with a function that differs between the first function information and the second function information.

In order to solve the above-described problem, an information processing method includes: a step for storing, in a storage section, game media possessed by a player among a plurality of kinds of game media as possessed game media such that the possessed game media are associated with a player ID; a step for storing, in a first storage area in a preliminary period before a prescribed time, first medium group information for identifying a plurality of the game media corresponding to a first game condition and being selected from among the possessed game media on the basis of the player's operation and storing, in a second storage area in the preliminary period, second medium group information for identifying a plurality of the game media corresponding to a second game condition different from the first game condition and for storing, in a post period after the prescribed time, the second medium group information in the first storage area on the basis of the player's operation; a step for enabling, in the preliminary period, the execution of a game using the first medium group information stored in the first storage area and a game using the second medium group information stored in the second storage area on the basis of the player's operation and for enabling, in the post period, the execution of a game using the second medium group information stored in the first storage area on the basis of the player's operation and disabling, in the post period, the execution of a game using the first medium group information; and a step for storing, in the first storage area in the post period, the second medium group information stored in the second storage area in the preliminary period on the basis of the player's operation.

In order to solve the above-described problem, an information processing program causes a computer to function as: a game medium storage unit for storing, in a storage section, game media possessed by a player among a plurality of kinds of game media as possessed game media such that the possessed game media are associated with a player ID;

a medium group information storage unit that, in a preliminary period before a prescribed time, stores, in a first storage area, first medium group information for identifying a plurality of the game media corresponding to a first game condition and being selected from among the possessed game media on the basis of the player's operation and stores, in a second storage area, second medium group information for identifying a plurality of the game media corresponding to a second game condition different from the first game condition and that, in a post period after the prescribed time, stores the second medium group information in the first storage area on the basis of the player's operation; a game execution unit that, in the preliminary period, enables the execution of a game using the first medium group information stored in the first storage area and a game using the second medium group information stored in the second storage area on the basis of the player's operation and that, in the post period, enables the execution of a game using the second medium group information stored in the first storage area on the basis of the player's operation and disables the execution of a game using the first medium group information; and a transition unit that, in the post period, stores, in the first storage area, the second medium group information stored in the second storage area in the preliminary period on the basis of the player's operation.

Effects of Disclosure

According to the present invention, it is possible to enhance the ease of operation performed by a player.

BRIEF DESCRIPTION OF DRAWINGS

FIG. 3B is a drawing for illustrating card classifications provided in each of the distribution periods.
FIG. 3C is a drawing for illustrating the relationship between distribution periods and formats.
FIG. 8A is a drawing for illustrating an example of a format selection screen in a transition state.
FIG. 8B is a drawing for illustrating an example of the deck selection screen.
FIG. 12A is a drawing for illustrating an example of a battle format selection screen in the main release state.
FIG. 14A is a drawing for illustrating an example of function information for the ninth term.
FIG. 14B is a drawing for illustrating an example of function information for the prerelease state in the tenth term.
FIG. 14C is a drawing for illustrating an example of function information for the tenth term.

DESCRIPTION OF EMBODIMENTS

An aspect of an embodiment of the present invention will be described below in detail with reference to the accompanying drawings. The numerical values, etc. given in this embodiment are merely examples for facilitating understanding and do not limit the present invention unless otherwise specifically mentioned. In the present description and drawings, elements having substantially the same functions and configurations have the same reference signs attached thereto and are not described repeatedly, and elements that are not directly relevant to the present invention are not shown.

(Entire Configuration of Information Processing System S)

Figure 1:
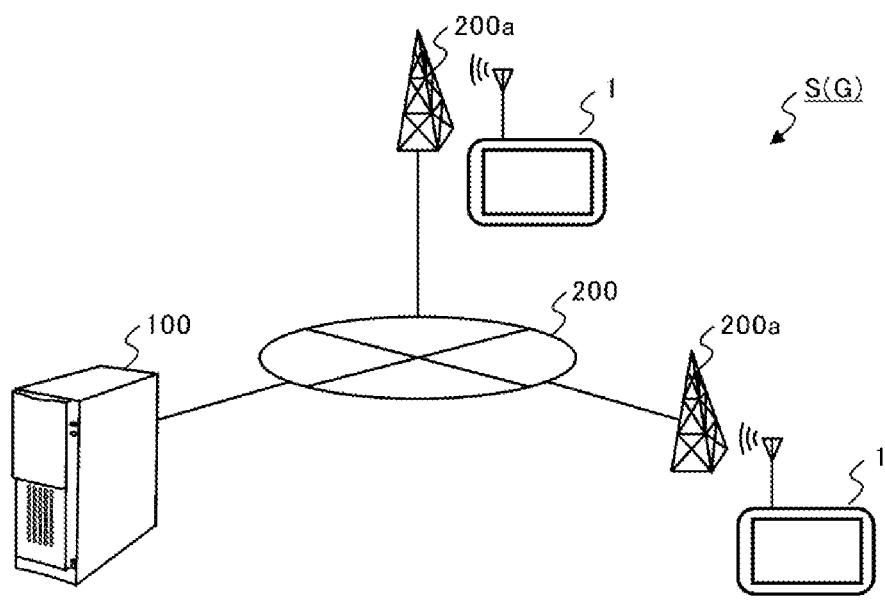
FIG. 1 is an illustration showing a schematic configuration of an information processing system.

FIG. 1 is an illustration showing the schematic configuration of an information processing system S. The information processing system S is what is called a client-server system, including player terminals 1, a server 100, and a communication network 200 having communication base stations 200a.

Each of the player terminals 1 can establish communication with the server 100 via the communication network 200. The player terminals 1 widely include electronic appliances that can be communicatively connected to the server 100 by wire or wirelessly. Examples of the player terminals 1 include smartphones, mobile phones, tablet devices, personal computers, game devices, etc. This embodiment will be described in the context of the case where smartphones are used as the player terminals 1.

The server 100 is communicatively connected to the plurality of player terminals 1. The server 100 accumulates various kinds of information (player information) for each player who plays a game. Furthermore, the server 100 updates the accumulated information and controls the progress of the game on the basis of operations input from the player terminals 1.

The communication base stations 200a are connected to the communication network 200, and send information to and receive information from the player terminals 1 wirelessly. The communication network 200 is configured of a mobile phone network, the Internet, a local area network (LAN), a dedicated line, etc., and realizes wired or wireless communicative connection between the player terminals 1 and the server 100.

In the information processing system S in this embodiment, a player terminal 1 and the server 100 function as game devices G. The player terminal 1 and the server 100 individually have assigned thereto roles for controlling the progress of the game such that it is possible to proceed with the game through cooperation between the player terminal 1 and the server 100.

(Hardware Configurations of Player Terminal 1 and Server 100)

Figure 2A:
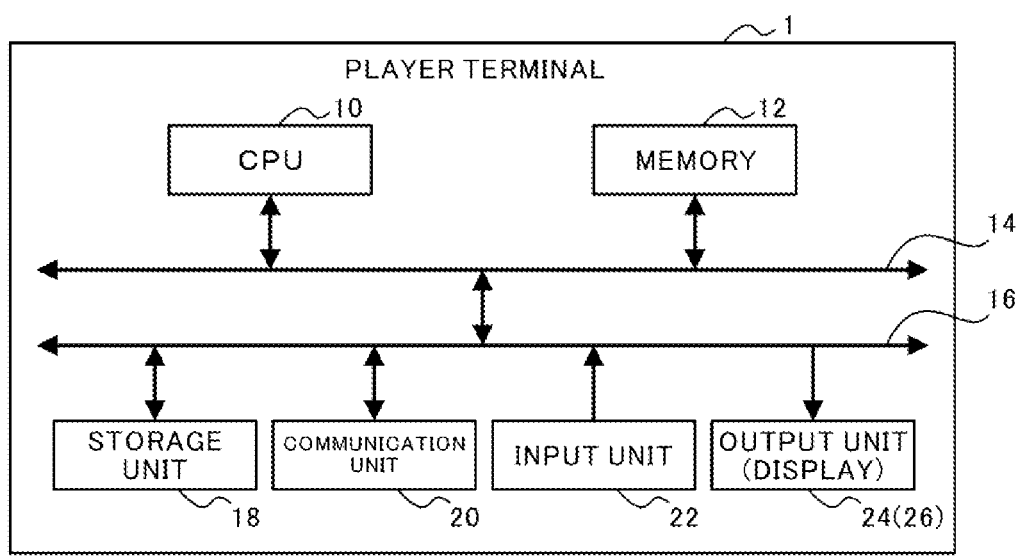
FIG. 2A is a drawing for illustrating the hardware configuration of a player terminal.
Figure 2B:
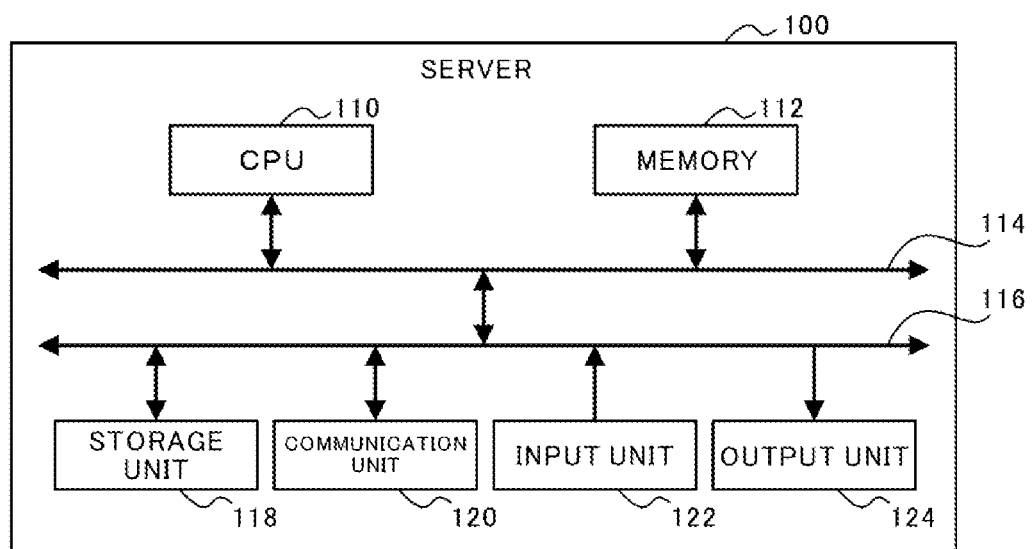
FIG. 2B is a drawing for illustrating the hardware configuration of a server.

FIG. 2A is a drawing for illustrating the hardware configuration of the player terminal 1. In addition, FIG. 2B is a drawing for illustrating the hardware configuration of the server 100. As shown in FIG. 2A, the player terminal 1 is configured to include a central processing unit (CPU) 10, a memory 12, a bus 14, an input/output interface 16, a storage unit 18, a communication unit 20, an input unit 22, and an output unit 24.

Furthermore, as shown in FIG. 2B, the server 100 is configured to include a CPU 110, a memory 112, a bus 114, an input/output interface 116, a storage unit 118, a communication unit 120, an input unit 122, and an output unit 124.

The configurations and functions of the CPU 110, the memory 112, the bus 114, the input/output interface 116, the storage unit 118, the communication unit 120, the input unit 122, and the output unit 124 of the server 100 are substantially the same as those of the CPU 10, the memory 12, the bus 14, the input/output interface 16, the storage unit 18, the communication unit 20, the input unit 22, and the output unit 24, respectively, of the player terminal 1. Thus, a description of the hardware configuration of the player terminal 1 will be given below, and a description of the server 100 will be omitted.

The CPU 10 runs a program stored in the memory 12 to control the progress of the game. The memory 12 is configured of a read only memory (ROM) or a random access memory (RAM), and stores the program, as well as various kinds of data, needed for controlling the progress of the game. The memory 12 is connected to the CPU 10 via the bus 14.

The input/output interface 16 is connected to the bus 14. The storage unit 18, the communication unit 20, the input unit 22, and the output unit 24 are connected to the input/output interface 16.

The storage unit 18 is configured of a semiconductor memory, such as a dynamic random access memory (DRAM), and stores various kinds of programs and data. At the player terminal 1, the programs and data stored in the storage unit 18 are loaded into the memory 12 (RAM) by the CPU 10.

The communication unit 20 is communicatively connected to the communication base stations 200a wirelessly, and sends information to and receives information from the server 100 via the communication network 200, such as various kinds of data and programs. At the player terminal 1, the programs, etc. received from the server 100 are stored in the memory 12 or the storage unit 18.

The input unit 22 is configured of, for example, a touchscreen, buttons, a keyboard, a mouse, arrow keys, or an analog controller with which the player's operations are input (operations are accepted). Alternatively, the input unit 22 may be a special controller provided in the player terminal 1 or connected (externally attached) to the player terminal 1. Alternatively, the input unit 22 may be configured of an acceleration sensor that detects tilting or movement of the player terminal 1 or a microphone that detects the player's speech. That is, the input unit 22 widely includes devices that enable the player to input his or her intents in distinguishable manners.

The output unit 24 is configured to include a display device and a speaker. The output unit 24 may be a device connected (externally attached) to the player terminal 1. In this embodiment, the player terminal 1 is provided with a display 26 as the output unit 24 and is provided with a touchscreen as the input unit 22, wherein the touchscreen is laid over the display 26.

(Game Specifics)

Next, specifics of the game provided by the information processing system S (game device G) in this embodiment will be described by using an example. The game in this embodiment is a so-called digital card game. A player acquires and possesses, by lottery, etc., a plurality of kinds of cards provided from a game administrator. The player can play a card battle game in which the player fights a battle against a computer or another player by using his/her possessed cards. Specifics of the game in this embodiment will be described below in detail.

Figure 3A:
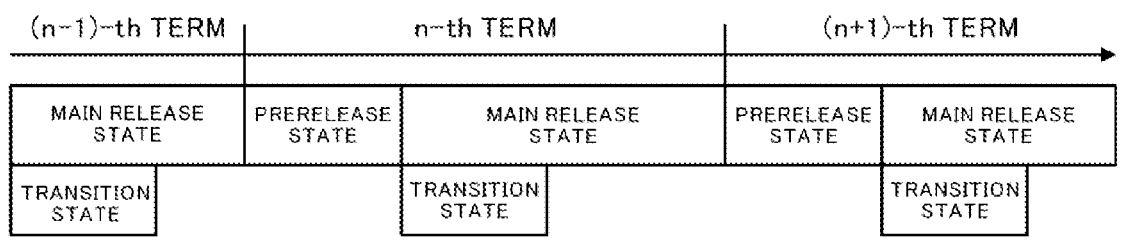
FIG. 3A is a drawing for illustrating distribution periods of a game.

FIG. 3A is a drawing for illustrating distribution periods of the game. FIG. 3B is a drawing for illustrating card classifications provided in each of the distribution periods. FIG. 3C is a drawing for illustrating the relationship between distribution periods and formats. In this embodiment, the player is provided with cards that differ from one distribution period to another. In addition, game conditions, namely available cards, in the card battle game differ for each of the distribution periods. Here, as an example, one distribution period is composed of four months, and the distribution period is updated every four months. The distribution periods are described by the names the (n−1)-th term, the n-th term, and the (n+1)-th term, as shown in FIG. 3A. Note that n of the n-th term describing a distribution period is any integer and is incremented by one every four months.

As shown in FIG. 3A, each of the distribution periods has two distribution states: a prerelease state (hereinafter, may be referred to as a pre state) and a main release state. Here, as an example, the prerelease state continues for one month, and the main release state continues for three months. In each of the distribution periods, first the prerelease state is set, maintenance work is carried out in a switching period one month after the start of the prerelease state, and thereafter the main release state is set. In other words, in each of the distribution periods, the prerelease state is set before the switching period, and the main release state is set after the switching period.

Although described in detail below, each of the distribution periods has a transition state that continues for a predetermined time period from the start of the main release state (switching period). This transition state is provided in order to allow the player to migrate data in the prerelease state. The game condition for the card battle game that can be played is the same for the main release state and the transition state. Here, as an example, the transition state is set to continue for one week. Note that the transition state is set concurrently with the main release state.

As described above, a card battle game using cards is provided in this embodiment. Cards used in the card battle game are provided by the game administrator, and each time the distribution period is updated, the provision of new cards starts. Here, there are a plurality of card classifications to which the cards belong. In other words, each of the cards belongs to at least one card classification, and at least some of the cards belonging to the plurality of card classifications differ among the card classifications. As an example, 120 kinds of cards belong to one card classification in this embodiment.

For example, as shown in FIG. 3B, an eighth card classification is newly provided in the eighth term, a ninth card classification is newly provided in the ninth term, and a tenth card classification is newly provided in the tenth term. In short, in the n-th term, a plurality of kinds of cards belonging to the n-th card classification are newly provided. In addition, in each of the distribution periods, cards that were provided in the distribution periods prior thereto are also provided. Therefore, in the n-th term, cards belonging to the first to n-th card classifications are provided.

Hereinafter, the n-th card classification that is newly provided in the n-th term is referred to as a new card classification, and the card classifications that were provided before the n-th term are referred to as old card classifications. In addition, the cards belonging to the new card classification are referred to just as new cards, and cards belonging to the old card classifications are referred to as old cards.

Note that the provision of a card in this embodiment means that the player is in a state in which he/she can acquire the card. A state in which the player can use a card in the card battle game is referred to as the possession of the card. The player is allowed to possess a provided card by acquiring the card by lottery, etc. and is allowed to use the possessed card in the card battle game.

In addition, the card battle game in this embodiment is categorized into three kinds of formats: rotation, unlimited, and prerotation. A format specifies card classifications, i.e., cards, that are available in the card battle game, and it can be said that a format constitutes a game condition in the card battle game. The player first selects a format before starting the card battle game and plays the card battle game by using only the cards corresponding to the selected format.

The rotation format is a format for allowing the use of only cards belonging to the most recent five kinds of card classifications among the provided card classifications. On the other hand, the unlimited format is a format in which the player can use not only the five most recent kinds of card classifications, as in the rotation format in the same term, but also all of the possessed cards among the cards belonging to all card classifications provided there before. Thus, the rotation format and the unlimited format differ in the cards that can be used by the player in the card battle game. The player can select the two formats, rotation and unlimited, at any time in each of the distribution periods.

Here, as described above, each time the distribution period is updated, a new card classification is provided. For this reason, the five most recent kinds of card classifications that can be used in the rotation format differ from one distribution period to another. Because the eighth card classification is newly provided in the eighth term as shown in FIG. 3B, the five most recent kinds of card classifications are composed of the fourth to eighth card classifications. On the other hand, because the ninth card classification is newly provided in the ninth term, the five most recent kinds of card classifications are composed of the fifth to ninth card classifications. In the tenth term, the five most recent kinds of card classifications are composed of the sixth to tenth card classifications.

Also, as shown in FIG. 3C, the five most recent kinds of card classifications can be used with the rotation format in the main release state in each of the distribution periods. On the other hand, in the prerelease state in each of the distribution periods, the player can use, with the rotation format, the card classifications identical to those available in the immediately preceding distribution period. More specifically, in the prerelease state in the eighth term, the third to seventh card classifications can be used with the rotation format. In the prerelease state in the ninth term, the fourth to eighth card classifications can be used with the rotation format. In the prerelease state in the tenth term, the fifth to ninth card classifications can be used with the rotation format.

In other words, the game condition with the rotation format in the prerelease state is identical to that with the rotation format in the main release state in the immediately preceding distribution period. This means that, in the prerelease state, the player can continue to play the game with the rotation format in the main release state in the immediately preceding distribution period.

Also, in the prerelease state, the prerotation format is added, in addition to the rotation format. The prerotation format represents the same game condition as that represented by the rotation format in the main release state in the same distribution period. Therefore, in the prerelease state in the eighth term, the fourth to eighth card classifications are available with the prerotation format. In the prerelease state in the ninth term, the fifth to ninth card classifications are available with the prerotation format. In the prerelease state in the tenth term, the sixth to tenth card classifications are available with the prerotation format.

Thus, in the prerelease state, the player can play the game not only with the rotation format in the main release state in the immediately preceding distribution period but also with the rotation format in the main release state in the new distribution period, in the form of the prerotation format. Note that the player cannot play with the prerotation format in the main release state. Differences between the prerelease state and the main release state will be described below in detail.

Figure 4A:
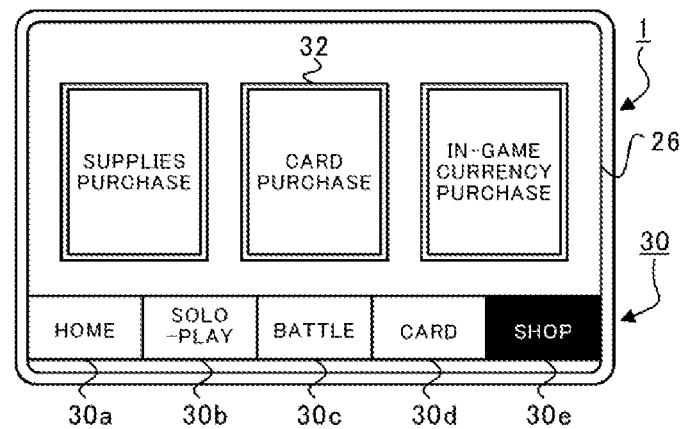
FIG. 4A is a diagram showing an example of a purchase type selection screen.
Figure 4B:
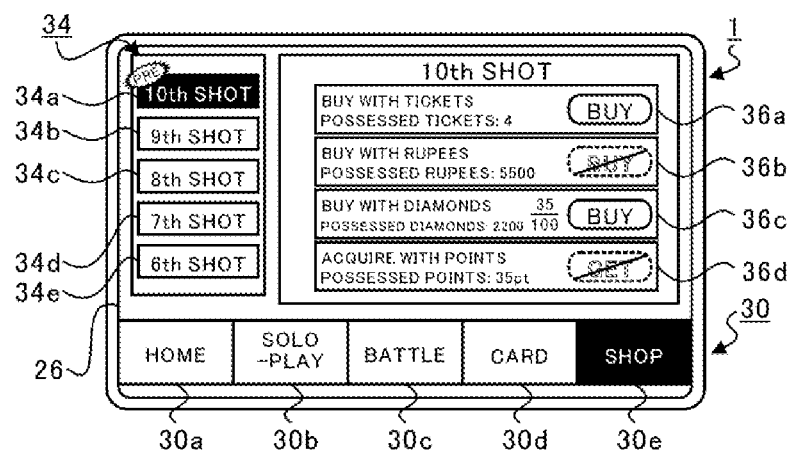
FIG. 4B is a drawing for illustrating an example of a card purchase screen in a prerelease state.
Figure 4C:
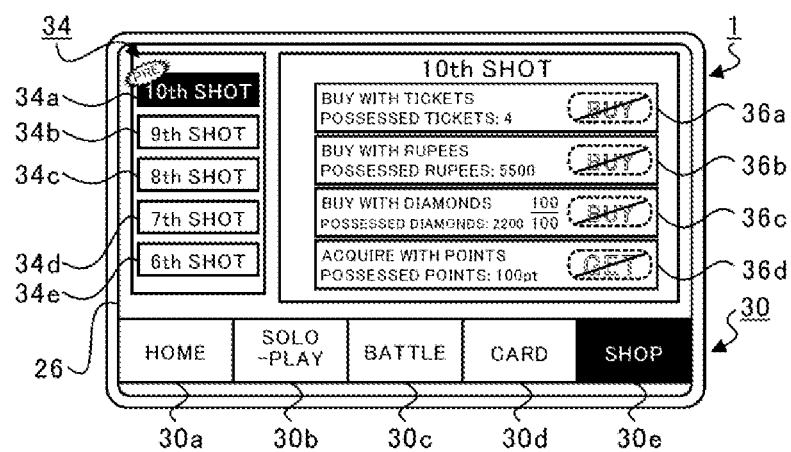
FIG. 4C is a drawing for illustrating a limited number of times.
Figure 4D:
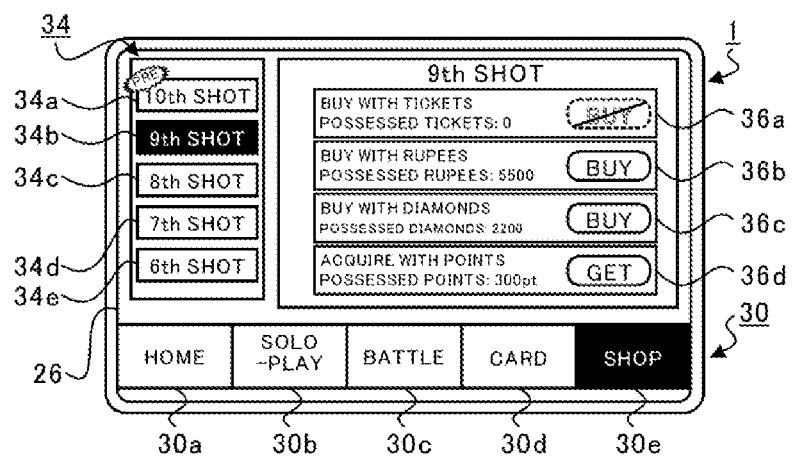
FIG. 4D is a drawing for illustrating a ceiling function.
Figure 5A:
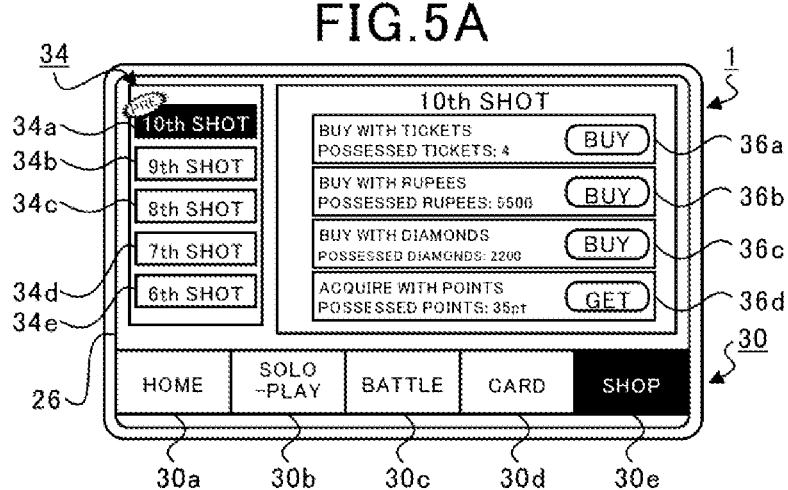
FIG. 5A is a drawing for illustrating an example of a card purchase screen in a main release state.
Figure 5B:
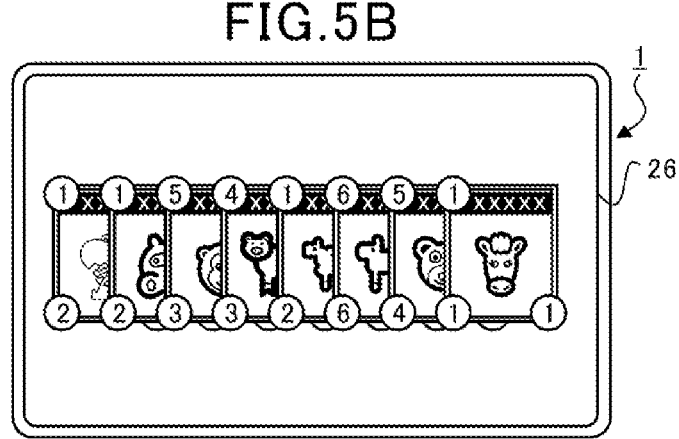
FIG. 5B is a drawing for illustrating an example of a lottery result screen.

FIG. 4A is a diagram showing an example of a purchase type selection screen. FIG. 4B is a drawing for illustrating an example of a card purchase screen in the prerelease state. FIG. 4C is a drawing for illustrating a limited number of times. FIG. 4D is a drawing for illustrating a ceiling function. In addition, FIG. 5A is a drawing for illustrating an example of a card purchase screen in the main release state. FIG. 5B is a drawing for illustrating an example of a lottery result screen. For example, when the present game application is started, communication between the player terminal 1 and the server 100 starts, a login state is entered, and the game starts.

As shown in FIG. 4A, a menu bar 30 is displayed on the display 26 during the game. A plurality of operating sections that can be operated (tapped) by the player are provided in the menu bar 30. Here, a home screen selection section 30a captioned "home", a solo-play selection section 30b captioned "solo-play", a battle selection section 30c captioned "battle", a card screen selection section 30d captioned "card", and a purchase type selection section 30e captioned "shop" are provided in the menu bar 30 as examples of the operating sections.

When the home screen selection section 30a is tapped, a predetermined home screen is displayed on the display 26. When the solo-play selection section 30b is tapped, various kinds of setting screens are displayed. When setting is performed on the setting screens, a card battle game in the form of a battle against the computer is started. When the battle selection section 30c is tapped, various kinds of setting screens are displayed. When setting is performed on the setting screens, a card battle game in the form of a battle against another player through communication is started. When the card screen selection section 30d is tapped, deck organization, card list display, card destroying/creating, etc. can be performed, as described below.

When the purchase type selection section 30e is tapped, the purchase type selection screen shown in FIG. 4A is displayed on the display 26. On the purchase type selection screen, a supplies purchase tab captioned "supplies purchase", a card purchase tab 32 captioned "card purchase", and a currency purchase tab captioned "in-game currency purchase" are displayed. When the supplies purchase tab is tapped, a screen for purchasing various types of supplies is displayed, allowing the player to purchase various supplies, such as card patterns, through the player's operation.

When the currency purchase tab is tapped, the player can purchase in-game currencies that can be used only in the present game. By using in-game currencies, the player can execute a lottery for acquiring a card. In addition, the player can purchase a deck set in which a plurality of cards are set. Here, tickets, rupees, and diamonds are provided as the in-game currencies. Commercial products to be purchased and the time period in which each commercial product can be purchased are set for each of the in-game currencies. Note that the player can acquire in-game currencies by earning them as a game reward and/or purchasing them with payment.

When the card purchase tab 32 is tapped, the card purchase screen shown in FIG. 4B is displayed. Note that the card purchase screen is displayed differently depending on the distribution period, as well as the distribution state (prerelease state or main release state) in the distribution period. FIGS. 4B, 4C, and 4D show a card purchase screen in the prerelease state in the distribution period corresponding to the tenth term. A card classification selection section 34 is displayed on the card purchase screen. A tenth card classification tab 34a, a ninth card classification tab 34b, an eighth card classification tab 34c, a seventh card classification tab 34d, and a sixth card classification tab 34e are provided in the card classification selection section 34. Although not shown in the figure, first to fifth card classification tabs are displayed by performing a predetermined operation in the card classification selection section 34.

In addition, a ticket information field 36a, a rupee information field 36b, a diamond information field 36c, and a points information field 36d are displayed on the right of the card classification selection section 34. The number of possessed tickets with which a card pack composed of eight cards as one set can be purchased, as well as a purchase tab captioned "buy", is displayed in the ticket information field 36a. When the purchase tab displayed in this ticket information field 36a is tapped, a card pack is purchased by using tickets. Although described in detail below, the purchase of a card pack here means to draw cards by lottery, a so-called gacha. When a card pack is purchased, a lottery process for determining cards by lottery is executed. The eight cards determined by the lottery process are bestowed on the player. In short, it can be said that the operation for purchasing a card pack is an operation for requesting a card lottery process.

Note that tickets are provided for each card classification. For example, tickets that can be used to purchase a card pack for the tenth card classification cannot be used to purchase a card pack for another card classification. The number of possessed tickets displayed in the ticket information field 36a corresponds to the tab tapped in the card classification selection section 34. Therefore, when the tenth card classification tab 34a is tapped, the number of possessed tickets for the tenth card classification is displayed in the ticket information field 36a, as shown in FIG. 4B. When the ninth card classification tab 34b is tapped, the number of possessed tickets for the ninth card classification is displayed in the ticket information field 36a, as shown in FIG. 4D. The player can acquire tickets, for example, as a result of the tickets being provided by the game administrator or as a reward for a result of the card battle game.

The number of rupees possessed by the player, as well as a purchase tab captioned "buy", is displayed in the rupee information field 36b. When the purchase tab displayed in this rupee information field 36b is tapped, a card pack is purchased by using a predetermined number of rupees. Note that rupees can be used for card packs for all card classifications. It should be noted, however, that, in the prerelease state, a card pack for the new card classification cannot be purchased by using rupees. For this reason, in the prerelease state, the purchase tab in the rupee information field 36*b* for the new card classification is grayed out and is displayed so as not to accept the player's operation, as shown in FIG. 4B.

The number of diamonds possessed by the player, as well as a purchase tab captioned "buy", is displayed in the diamond information field 36*c*. When the purchase tab displayed in this diamond information field 36*c* is tapped, a card pack is purchased by using a predetermined number of diamonds. Note that diamonds can be used for card packs for all card classifications. In addition, diamonds, unlike rupees, can be used to purchase a card pack for the new card classification even in the prerelease state.

The current points acquired by the player, as well as an acquisition tab captioned "GET", are displayed in the points information field 36*d*. In this embodiment, when a card pack is purchased once, one point is given to the player. Also, when the points acquired by the player reach a ceiling value (here, 300 points), the player can select and acquire his/her favorite card from among a plurality of preset cards.

It should be noted, however, that the points are managed individually for each card classification. For example, one point is added to the points for the tenth card classification when a card pack for the tenth card classification is purchased once, and 10 points are added to the points for the ninth card classification when a card pack for the ninth card classification is purchased ten times. Therefore, when the tenth card classification tab 34*a* is tapped, the points for the tenth card classification are displayed in the points information field 36*d*, as shown in FIG. 4B. When the ninth card classification tab 34*b* is tapped, the points for the ninth card classification are displayed in the points information field 36*d*, as shown in FIG. 4D.

In addition, a card that can be acquired in the case where the points reach the ceiling value is limited to one belonging to the card classification corresponding to the points that have reached the ceiling value. Therefore, for example, when the points for the ninth card classification reach the ceiling value as shown in FIG. 4D, the player can select and acquire a predetermined card belonging to the ninth card classification by tapping the acquisition tab in the points information field 36*d* but cannot acquire a card belonging to another card classification. Here, this embodiment is configured so that in the case where the point value does not reach the ceiling value, the acquisition tab in the points information field 36*d* is greyed out as shown in FIG. 4B and does not accept the player's operation. On the other hand, in the case where the point value reaches the ceiling value, the acquisition tab in the points information field 36*d* is displayed normally as shown in FIG. 4D, allowing an operation for selecting and acquiring one of the cards to be accepted.

Here, note that in a state in which the points reach the ceiling value, the player can also purchase a card pack for the same card classification by using tickets, etc. It should be noted, however, that in a state in which the points reach the ceiling value, only the acquisition tab in the points information field 36*d* may be enabled, and the purchase of a card pack for the same card classification by using tickets, etc. may be disabled. In addition, this embodiment is configured so that if the player cannot purchase a card pack because the number of possessed tickets is 0, the number of rupees or diamonds does not satisfy the required number, etc., then the purchase tabs are greyed out and do not accept the player's operation.

Here, in this embodiment, the number of purchased card packs for the new card classification is restricted in the prerelease state. More specifically, in the prerelease state in the tenth term, restriction is placed on the number of purchases of a card pack for the tenth card classification, which is newly provided in the tenth term. In other words, the execution of the card lottery process exceeding a preset limited number of times (here, 800) is restricted in the prerelease state. Therefore, in the prerelease state in the tenth term, a card pack for the tenth card classification can be purchased only up to 100 times.

For example, in the diamond information field 36*c*, the upper limit number of purchases of a card pack (denominator) and the number of purchases of a card pack for the relevant card classification so far (numerator) are displayed, as shown in FIGS. 4B and 4C. When the number of purchases of a card pack has reached the upper limit, the purchase tabs in the ticket information field 36*a* and the diamond information field 36*c* are greyed out, thus not accepting the player's operation.

It should be noted, however, that the number of purchases of a card pack in the prerelease state is restricted only for the new card classification, and no restriction is placed on the number of purchases of card packs for the old card classifications. Therefore, when an old card classification is selected by means of the card classification selection section 34 as shown in FIG. 4D, the number of purchases of a card pack and the upper limit number of purchases are not displayed.

In addition, FIG. 5A shows a card purchase screen in the main release state in the tenth term. In the main release state, the purchase of a card pack is not restricted for the new card classification. Therefore, as shown in FIG. 5A, the number of purchases of a card pack and the upper limit number of purchases are not also displayed on the card purchase screen for the new card classification. In addition, in the main release state, a card pack for the new card classification can also be purchased by using rupees.

As described above, the player can select a card classification by tapping each of the tabs in the card classification selection section 34. When a purchase operation is performed by tapping a purchase tab, one of the plurality of kinds of cards belonging to one card classification selected by the player is determined by lottery. Also, in the prerelease state, the execution of the lottery process for a new card belonging to a particular card classification (i.e., the new card classification) is restricted if the number of purchases exceeds the limited number of times. Regarding old cards belonging to the old card classifications (i.e., the card classifications other than the particular card classification), the lottery process can be executed a number of times exceeding the limited number of times. In addition, although execution of the lottery process for a new card exceeding the limited number of times is restricted in the prerelease state, the lottery process for a new card in the main release state can be executed a number of times exceeding the limited number of times.

Here, the current number of purchases of a card pack is compared with the upper limit number of purchases of a card pack. In the case where the number of purchases of a card pack reaches the upper limit number of purchases, the purchase tabs on the player terminal 1 are displayed in a greyed out manner, thereby not accepting a purchase operation. It should be noted, however, that the method for not accepting a purchase operation is not limited to this but may include, for example, a method in which information indicating that a purchase operation has been performed is transmitted to the server 100, which then determines whether or not purchase is possible.

When a card pack is purchased as a result of one of the above-described purchase tabs being tapped, the lottery process is executed in the server 100. The player terminal 1 receives, from the server 100, the result of this lottery process, i.e., lottery result information indicating the types of the cards bestowed on the player. In the player terminal 1, a lottery result screen for reporting eight cards determined by the lottery process is displayed on the display 26 on the basis of the received lottery result information, as shown in FIG. 5B.

Here, in this embodiment, each time the player purchases one card pack, he/she is given one point, as described above. In addition, the ceiling value serving as points needed for exchange with a card is set as 300. On the other hand, in the prerelease state, the upper limit number of times a card pack for the new card classification can be purchased is set as 100. In short, in the prerelease state, the points for the new card classification cannot reach the ceiling value. In other words, in the prerelease state, even if the number of times the lottery process is executed reaches the limited number of times, the point value for the new card classification does not reach the ceiling value. This prevents the occurrence of a contradiction in that the player can acquire his/her favorite card irrespective of restrictions being placed on the purchase of a card pack.

Note that the points acquired in the prerelease state are carried over even after the main release state has been entered. Also, when the distribution period is updated, the points are carried over as-is. This prevents the player from having a sense of loss due to the points becoming expired. It should be noted, however, that the player need not be given points in the prerelease state and may be given points only in the main release state. In addition, the points may be reset when the distribution period is updated.

Cards determined by the lottery process, i.e., cards acquired by the player by lottery, and cards acquired via exchange with points, as described above, are stored as possessed cards. The player organizes one deck by selecting a plurality of (e.g., 40) cards from among the possessed cards. The player can organize and save a plurality of decks. The player can select one of the saved decks and use it in the card battle game. Organization of a deck will be described below.

Figure 6A:
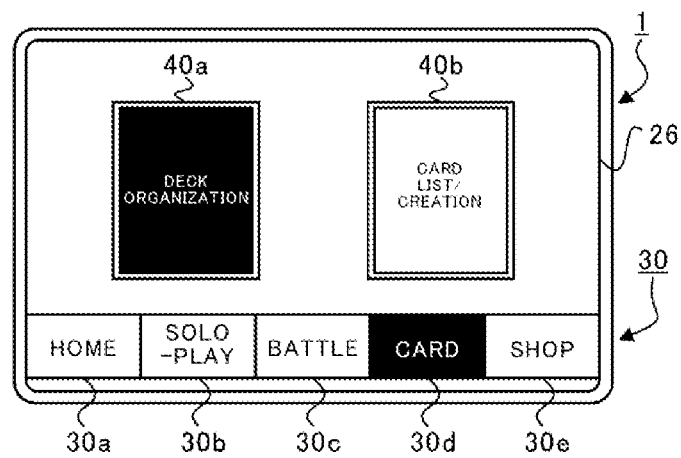
FIG. 6A is a drawing for illustrating an example of a card setting screen.
Figure 6B:
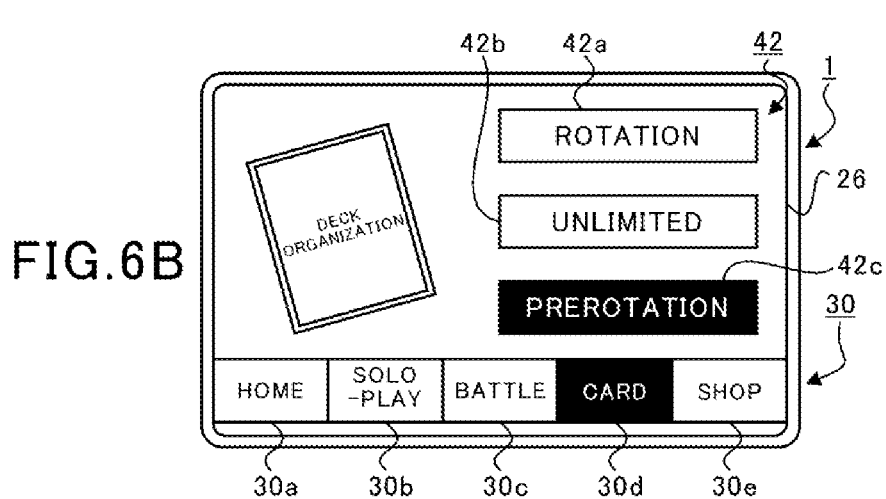
FIG. 6B is a drawing for illustrating an example of a format selection screen in the prerelease state.
Figure 6C:
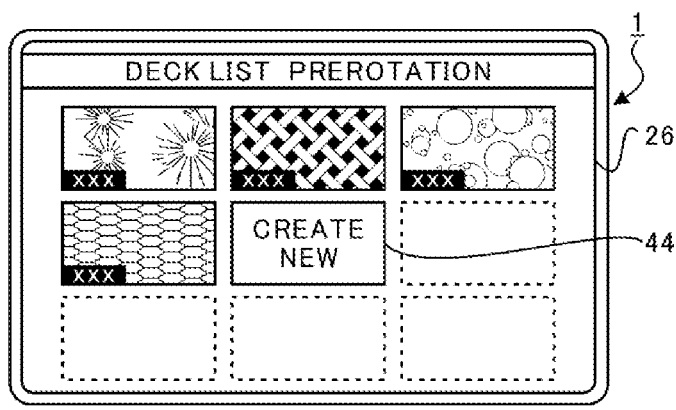
FIG. 6C is a drawing for illustrating an example of a deck selection screen.

FIG. 6A is a drawing for illustrating an example of a card setting screen. FIG. 6B is a drawing for illustrating an example of a format selection screen in the prerelease state. FIG. 6C is a drawing for illustrating an example of a deck selection screen. When the card screen selection section 30d in the menu bar 30 is tapped, the card setting screen shown in FIG. 6A is displayed. A deck organization tab 40a and a card list/creation tab 40b are displayed on the card setting screen. When the deck organization tab 40a is tapped, the format selection screen shown in FIG. 6B is displayed.

The format selection screen displays different content depending on whether the distribution state is the prerelease state and the transition state or the main release state (except the transition state). On the format selection screen, format selection tabs 42 for selecting a format that determines the format of a deck to be organized are displayed. In the prerelease state and the transition state, a rotation format selection tab 42a, an unlimited format selection tab 42b, and a prerotation format selection tab 42c are displayed as the format selection tabs 42.

When one of the format selection tabs 42 is tapped, the deck selection screen shown in FIG. 6C is displayed. On the deck selection screen, a list of decks organized by the player is displayed. Here, a deck can be organized so as to correspond to one of the formats, and only the decks corresponding to the format selected on the format selection screen are displayed on the deck selection screen.

For example, when the prerotation format selection tab 42c is tapped on the format selection screen as shown in FIG. 6B, a list of decks corresponding to the prerotation format is displayed as shown in FIG. 6C. When organizing a deck, the player can organize a deck name. On the deck selection screen, a deck name is displayed on an icon corresponding to each of the decks.

In addition, on the deck selection screen, a create deck tab 44 captioned "create new" is displayed. By tapping the create deck tab 44, the player can organize a new deck corresponding to the format selected on the format selection screen.

Figure 7A:
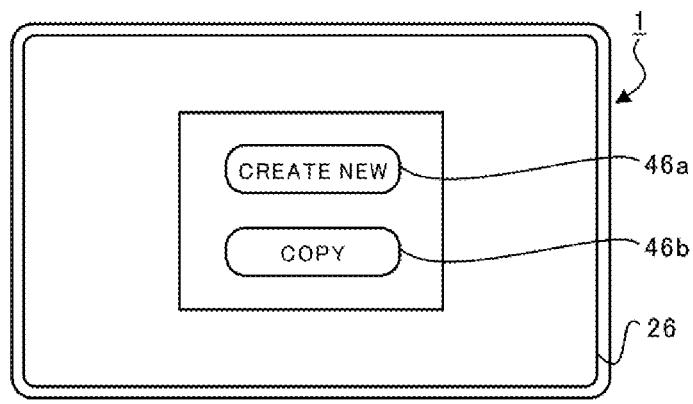
FIG. 7A is a drawing for illustrating an example of an organization method selection screen.
Figure 7B:
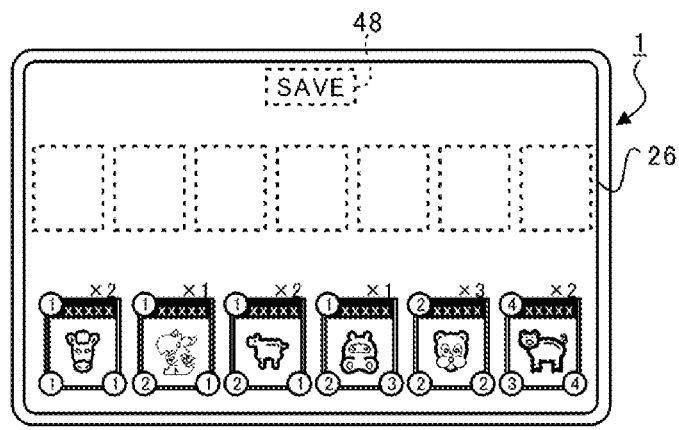
FIG. 7B is a drawing for illustrating an example of a deck organization screen in an initial state.
Figure 7C:
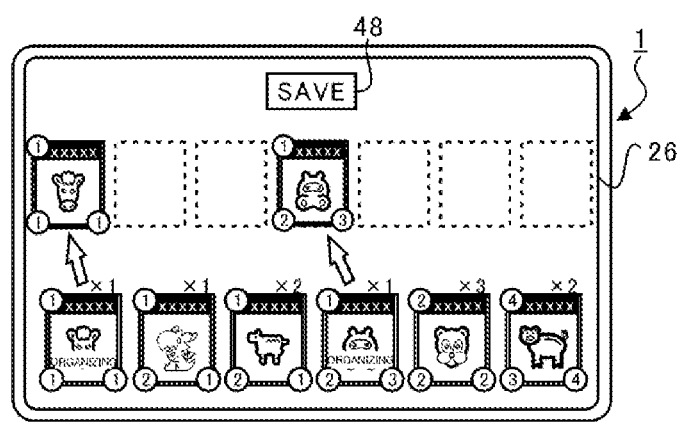
FIG. 7C is a drawing for illustrating an example of a deck organization screen during organization.
Figure 7D:
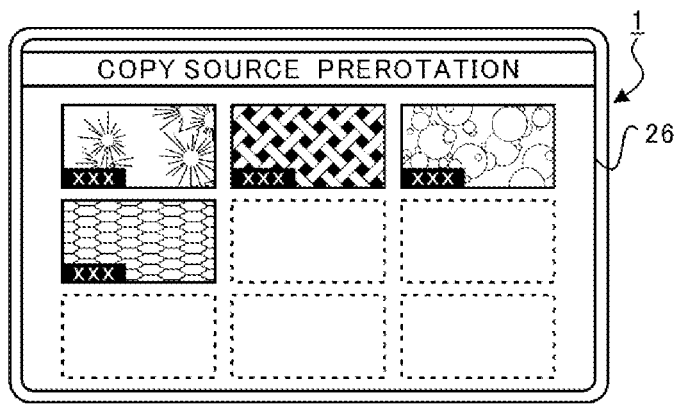
FIG. 7D is a drawing for illustrating an example of a copy source selection screen in the prerelease state.

FIG. 7A is a drawing for illustrating an example of an organization method selection screen. FIG. 7B is a drawing for illustrating an example of a deck organization screen in the initial state. FIG. 7C is a drawing for illustrating an example of a deck organization screen during organization. FIG. 7D is a drawing for illustrating an example of a copy source selection screen in the prerelease state. When the create deck tab 44 is tapped on the deck selection screen shown in FIG. 6C, the organization method selection screen shown in FIG. 7A is displayed on the display 26. A create new tab 46a captioned "create new" and a copy tab 46b captioned "copy" are displayed on the organization method selection screen.

When the create new tab 46a is tapped, a deck organization screen is displayed as shown in FIG. 7B. On this deck organization screen, a plurality of blank spaces are displayed in the upper row, and cards possessed by the player (hereinafter, referred to as possessed cards) are displayed in the lower row. It should be noted, however, that the possessed cards displayed on the deck organization screen are limited to those corresponding to the format selected by the player. Therefore, for example, in the prerelease state in the tenth term, when the prerotation format is to be organized, only the cards, among the possessed cards, belonging to the sixth to tenth card classifications are displayed, and when the rotation format is to be organized, only the cards belonging to the fifth to ninth card classifications are displayed.

Also, on the deck organization screen, the player slides a possessed card displayed in the lower row to the upper row, whereby the possessed card that has been slid is arranged in a blank space as shown in FIG. 7C. By doing so, the possessed card arranged in the upper row on the deck organization screen is temporarily registered. Also, when a save tab 48, captioned "save", provided on the deck organization screen is tapped, the deck information is stored. This deck information is assigned a deck ID, and card group information capable of identifying all possessed cards that are temporarily registered is stored in association with the deck ID. Although not shown in the figure, when the save tab 48 is tapped, a screen for editing the deck name is displayed, and when editing the deck name is completed, the deck name and the icon displayed on the deck selection screen, etc., as well as the card group information, are stored in association with the deck ID.

When an icon is tapped on the deck selection screen shown in FIG. 6C, a deck organization screen is also displayed as shown in FIG. 7C. It should be noted, however, that, in this case, cards constituting the deck selected on the deck selection screen are displayed in the upper row, and the possessed cards are displayed in the lower row. In this case, a card displayed in the upper row can be exchanged with a possessed card displayed in the lower row by means of the player's operation.

In addition, when the copy tab 46b is tapped on the organization method selection screen, the copy source selection screen shown in, for example, FIG. 7D is displayed. Decks that can be selected as a copy source are displayed on the copy source selection screen. Similarly to the deck selection screen shown in FIG. 6C, this copy source selection screen is configured so that the player can select a currently stored deck. It should be noted, however, that decks that can be selected as a copy source differ depending on the distribution state and the format of a newly created deck, i.e., the format of a copy destination.

More specifically, in the case where the format of the copy destination is the unlimited format, the player can select a deck for any format as the copy source. Therefore, when a deck for the unlimited format is to be organized, all of the currently stored decks are displayed on the copy source selection screen so as to be selectable as a copy source. On the other hand, when a deck for the prerotation format is to be organized, currently stored decks only for the prerotation format are displayed on the copy source selection screen, as shown in FIG. 7D.

When an icon displayed on the copy source selection screen is tapped, a deck organization screen is displayed, similarly to the one shown in FIG. 7C. In this case, cards constituting the deck selected on the copy source selection screen are displayed in the upper row, and possessed cards are displayed in the lower row, so that a new deck can be organized on the basis of the deck serving as the copy source. Thus, by using a deck copy function, a deck with only some cards replaced with different cards can be easily organized.

In addition, when a deck for the rotation format is to be organized, the decks displayed on the copy source selection screen differ depending on the distribution state.

Figure 8C:
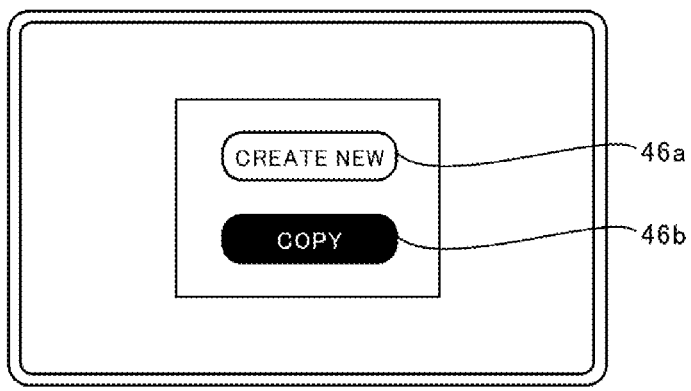
FIG. 8C is a drawing for illustrating an example of the organization method selection screen.
Figure 8D:
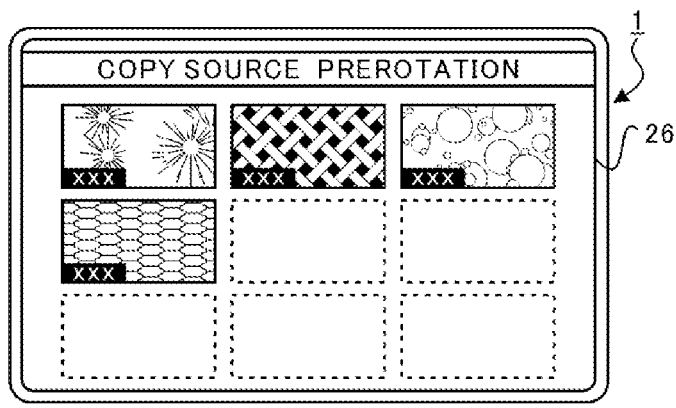
FIG. 8D is a drawing for illustrating an example of a copy source selection screen in the transition state.

FIG. 8A is a drawing for illustrating an example of a format selection screen in the transition state. FIG. 8B is a drawing for illustrating an example of a deck selection screen. FIG. 8C is a drawing for illustrating an example of an organization method selection screen. FIG. 8D is a drawing for illustrating an example of a copy source selection screen in the transition state. In the transition state, when the deck organization tab 40a is tapped on the card setting screen shown in FIG. 6A, the format selection screen shown in FIG. 8A is displayed. In the transition state, similarly to the prerelease state, the rotation format selection tab 42a, the unlimited format selection tab 42b, and the prerotation format selection tab 42c are displayed as the format selection tabs 42 on the format selection screen.

Also, when the rotation format selection tab 42a is tapped on the format selection screen, a list of decks for the rotation format is displayed on the deck selection screen shown in FIG. 8B. Note that FIG. 8B shows a state in which no decks for the rotation format are stored. If no decks for the format selected by the player are stored, only the create deck tab 44 is displayed on the deck selection screen.

When the create deck tab 44 is tapped on the deck selection screen, the organization method selection screen shown in FIG. 8C is displayed. At this time, when the copy tab 46b is tapped, the copy source selection screen shown in FIG. 8D is displayed. Here, when a deck for the rotation format is to be organized in the transition state, decks for the prerotation format and the rotation format are displayed on the copy source selection screen. More specifically, in the transition state, when a deck for the rotation format is to be newly created, the player can select a deck for the prerotation format or a deck for the rotation format as a deck serving as a copy source.

Figure 9A:
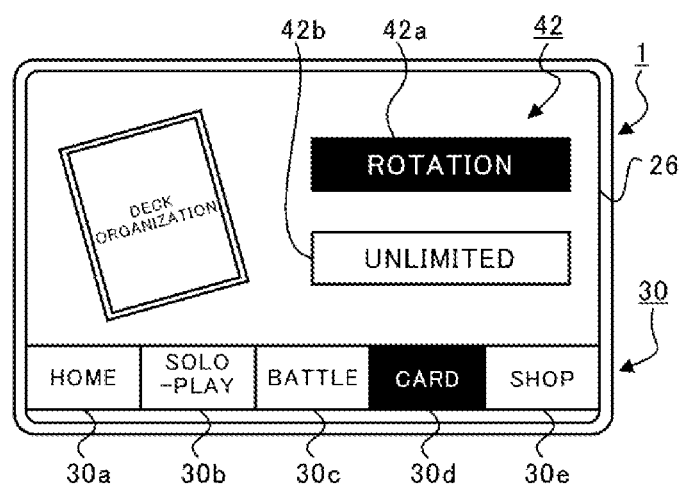
FIG. 9A is a drawing for illustrating an example of a format selection screen in the main release state.
Figure 9B:
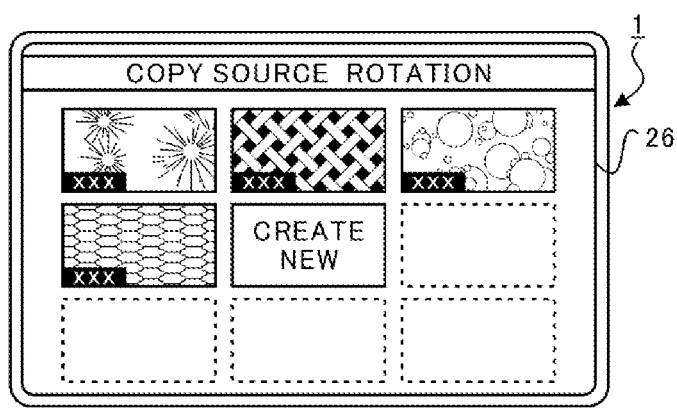
FIG. 9B is a drawing for illustrating an example of a copy source selection screen in the main release state.

FIG. 9A is a drawing for illustrating an example of a format selection screen in the main release state. FIG. 9B is a drawing for illustrating an example of a copy source selection screen in the main release state. In the main release state (except the transition state), when the deck organization tab 40a is tapped on the card setting screen shown in FIG. 6A, the format selection screen shown in FIG. 9A is displayed. In the main release state (except the transition state), the rotation format selection tab 42a and the unlimited format selection tab 42b are displayed as the format selection tabs 42 on the format selection screen. In short, in the main release state (except the transition state), unlike the prerelease state and the transition state, the prerotation format selection tab 42c is not displayed. Because the prerotation format selection tab 42c is not displayed as described above, a deck corresponding to the prerotation format cannot be organized in the main release state (except the transition state).

Also, it is assumed that the rotation format selection tab 42a is tapped on the format selection screen, the create deck tab 44 is tapped on the deck selection screen (refer to FIG. 8B), and the copy tab 46b is tapped on the organization method selection screen (refer to FIG. 8C). Under this assumption, the copy source selection screen shown in FIG. 9B is displayed. When a deck for the rotation format is to be organized in the main release state (except the transition state), only decks for the rotation format are displayed on the copy source selection screen, and decks for the prerotation format and the unlimited format are not displayed. In short, when a deck for the rotation format is to be newly created in the main release state (except the transition state), the player can select, as a deck to serve as a copy source, only an already organized deck for the rotation format.

For example, in the prerelease state in the tenth term, cards belonging to the fifth to ninth card classifications can be used in a card battle game with the rotation format, and cards belonging to the sixth to tenth card classifications can be used in a card battle game with the prerotation format. In addition, in the main release state (including the transition state) subsequent to the prerelease state, cards belonging to the sixth to tenth card classifications can be used in a card battle game with the rotation format, and no card battle games with the prerotation format can be executed.

In the tenth term, the prerotation format in the prerelease state and the rotation format in the main release state (including the transition state) represent the same game condition and have common cards available. Therefore, a deck for the prerotation format organized in the prerelease state also corresponds to the rotation format in the main release state (including the transition state). In the transition state, a deck for the rotation format can be organized by using, as a copy source, a deck for the prerotation format in the tenth term. By doing so, after transitioning to the main release state (including the transition state), the player is relieved of the trouble of organizing the same deck again as a deck used in the prerelease state, whereby it is possible to enhance the operability.

In this embodiment, the player can not only acquire a card by lottery or by exchange of points, as described above, but also create a card by himself/herself. The player can create a card by using coins bestowed on him/her in the game. In addition, the player can transform an unnecessary card into coins by destroying the card. It should be noted, however, that creating and destroying a card is partially restricted depending on the distribution state.

Figure 10A:
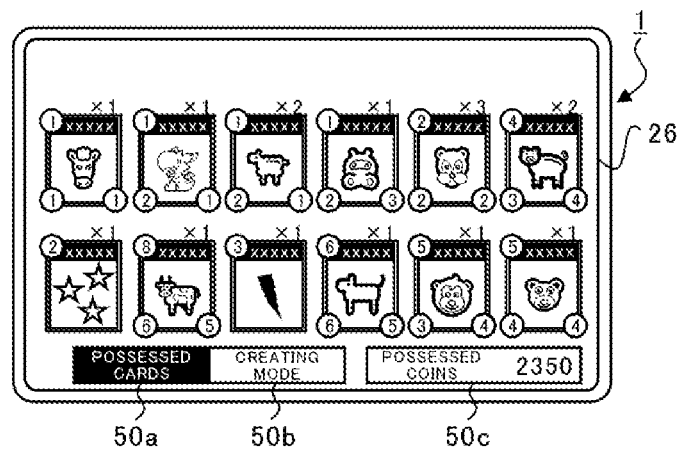
FIG. 10A is a drawing for illustrating an example of a card list screen.
Figure 10B:
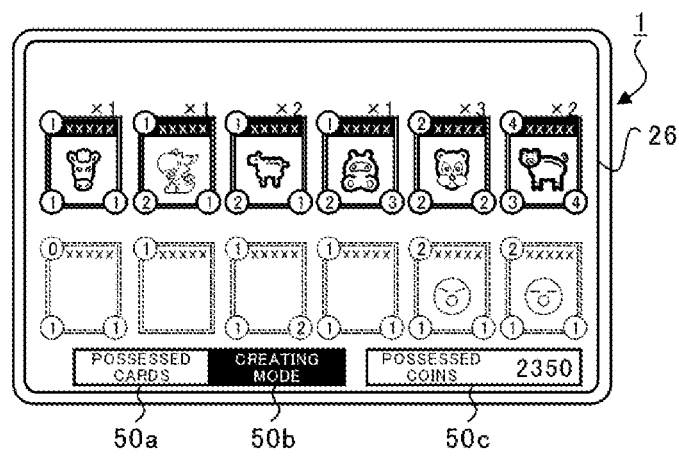
FIG. 10B is a drawing for illustrating an example of a card creating screen in the prerelease state.
Figure 10C:
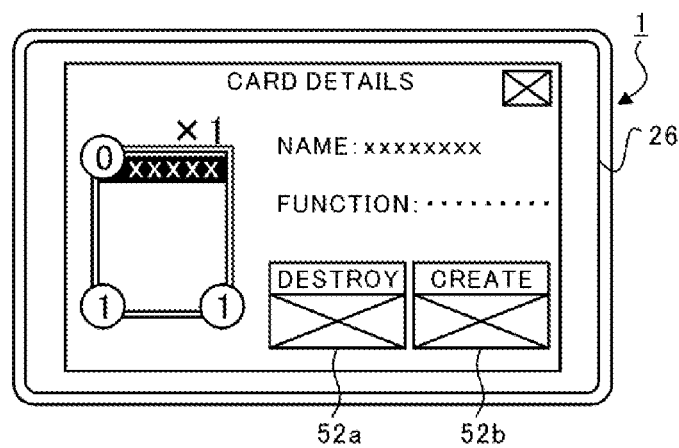
FIG. 10C is a drawing for illustrating an example of a card details screen in the prerelease state.
Figure 11A:
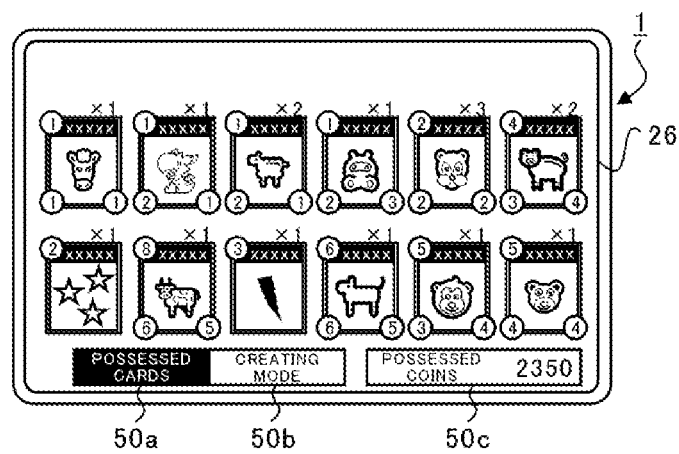
FIG. 11A is a drawing for illustrating an example of the card list screen.
Figure 11B:
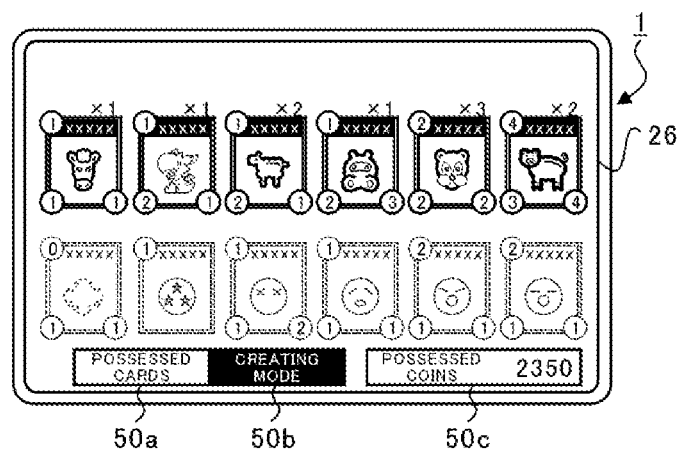
FIG. 11B is a drawing for illustrating an example of a card creating screen in the main release state.
Figure 11C:
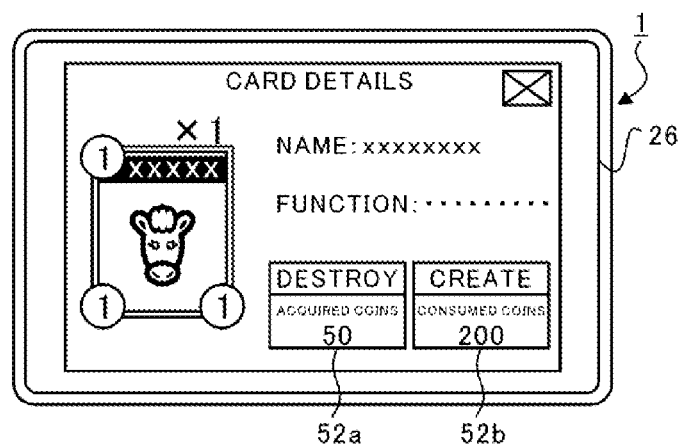
FIG. 11C is a drawing for illustrating an example of a card details screen in the main release state.

FIG. 10A is a drawing for illustrating an example of a card list screen. FIG. 10B is a drawing for illustrating an example of a card creating screen in the prerelease state. FIG. 10C is a drawing for illustrating an example of a card details screen in the prerelease state. FIG. 11A is a drawing for illustrating an example of a card list screen. FIG. 11B is a drawing for illustrating an example of a card creating screen in the main release state. FIG. 11C is a drawing for illustrating an example of a card details screen in the main release state. When the card list/creation tab 40b is tapped on the card setting screen shown in FIG. 6A, the card list screen shown in FIGS. 10A and 11A is displayed.

On this card list screen, a possessed card tab 50a, a creating mode tab 50b, and a possessed coin display field 50c are provided in the lower section of the display 26. The possessed card tab 50a and the creating mode tab 50b are configured so as to be capable of accepting the player's tap operation. The possessed card tab 50a and the creating mode tab 50b are also displayed on the card creating screen. When the possessed card tab 50a is tapped, the card list screen shown in FIGS. 10A and 11A is displayed. When the creating mode tab 50b is tapped, the card creating screen shown in FIGS. 10B and 11B is displayed. On the other hand, the number of possessed coins possessed by the player is displayed in the possessed coin display field 50c.

As shown in FIGS. 10A and 11A, the cards possessed by the player and the number of possessed cards are displayed on the card list screen. Note that a card that is not possessed by the player may be displayed on the card list screen. In addition, on the card creating screen, all of the provided cards are displayed, as shown in FIGS. 10B and 11B, regardless of whether or not the cards are possessed by the player. It should be noted, however, that the cards possessed by the player are displayed in color, whereas cards not possessed by the player are displayed in a greyed out manner (indicated by broken lines in FIGS. 10B and 11B). This enables the player to easily identify whether or not each of the displayed cards is possessed by the player himself/herself.

In addition, in the prerelease state, new cards among the cards not possessed by the player are displayed in a concealed manner. In this concealed display, patterns are not displayed, though card names and function information (described below) are displayed. In FIG. 10B, the leftmost card to the fourth card from the left among the cards in the lower row are displayed in a concealed manner, which indicates that these four cards are new cards. On the other hand, in the main release state (including transition state), the patterns of the new cards are also displayed, as shown in FIG. 11B. Note that, in concealed display of new cards, card names and function information may also be completely hidden.

When each of the cards is tapped on the card list screen and the card creating screen, a card details screen is displayed as shown in FIGS. 10C and 11C. On the card details screen, various types of information about the tapped card are displayed, and a destroying tab 52a and a creating tab 52b are provided. For example, in the main release state (including the transition state), the number of acquired coins is displayed on the destroying tab 52a provided on the card details screen, as shown in FIG. 11C. When the destroying tab 52a is tapped, the currently selected card is destroyed. By destroying the card, the player can acquire the same number of coins as that indicated as the number of acquired coins on the destroying tab 52a. Note that when a card is destroyed, the number of relevant possessed cards is reduced.

In other words, the player can exchange a possessed card for coins by tapping the destroying tab 52a. The above-described destroying function can be applied only to cards possessed by the player. Therefore, although not shown in the figure, the destroying tab 52a is greyed out on the card details screen of a card not possessed by the player, thereby not accepting a tap operation.

In addition, the number of consumed coins is displayed on the creating tab 52b provided on the card details screen. When the creating tab 52b is tapped, the selected card can be created by consuming the same number of coins as that indicated as the number of consumed coins on the creating tab 52b. When a card is created, the number of relevant possessed cards is increased. In other words, the player can exchange possessed coins for a card by tapping the creating tab 52b. Such a card creating function can be executed regardless of whether or not the card is possessed by the player. More specifically, the player can create both a possessed card and a non-possessed card.

Note that the provided cards may include cards that can be created and cards that cannot be created, or alternatively, all cards may be created. Furthermore, the provided cards may include cards that can be created only in a specified time period and cannot be created in other time periods.

Here, in the main release state (including the transition state), the card destroying function and creating function are not restricted. On the other hand, in the prerelease state, the card destroying function and creating function are restricted for some cards. More specifically, in the prerelease state, new cards cannot be destroyed or created. Therefore, in the prerelease state, the destroying tab 52a and the creating tab 52b are displayed on the card details screen of a new card in such a manner as to report that no tap operation is accepted, as shown in FIG. 10C. In this case, even when the destroying tab 52a and the creating tab 52b are tapped, the tap operation is not accepted.

It should be noted, however, that even in the prerelease state, the destroying tab 52a and the creating tab 52b are provided so as to be operable on the card details screen of an old card, similarly to the screen shown in FIG. 11C. In short, only old cards can be destroyed and created in the prerelease state.

As described above, in this embodiment, the creating tab 52b, which accepts an operation for selecting and acquiring one of the cards (creating operation), is provided, so that a card selected via a creating operation is stored as a possessed card. It should be noted, however, that a creating operation for a new card cannot be accepted in the prerelease state but can be accepted in the main release state (including the transition state). Thus, because acquisition of a new card via a purchase and creation is restricted in the prerelease state, the player has no choice but to play the card battle game with limited possessed cards, which enhances the genuine pleasure of the card battle game.

Note that, in the prerelease state, the acceptance of a creating operation for not only new cards but also old cards may be disabled. In addition, creation of some new cards may be allowed in the prerelease state. Furthermore, the number of new cards that can be created may be changed from period to period by, for example, increasing the number of creatable new cards in stages during a distribution period.

Figure 12B:
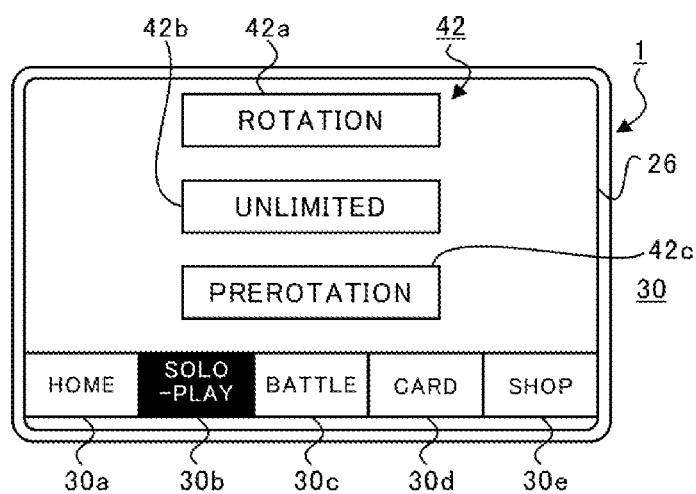
FIG. 12B is a drawing for illustrating an example of a battle format selection screen in the prerelease state.
Figure 12C:
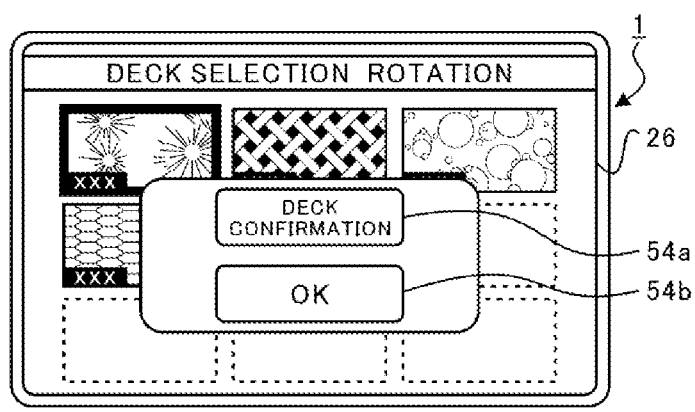
FIG. 12C is a drawing for illustrating an example of the deck selection screen.

Next, an example of the card battle game using the above-described decks and cards will be described. FIG. 12A is a drawing for illustrating an example of a battle format selection screen in the main release state. FIG. 12B is a drawing for illustrating an example of a battle format selection screen in the prerelease state. FIG. 12C is a drawing for illustrating an example of a deck selection screen. When the solo-play selection section 30b or the battle selection section 30c in the menu bar 30 is tapped, the battle format selection screen shown in FIG. 12A or 12B is displayed. This battle format selection screen is a screen for selecting the format of the card battle game to be played.

In the main release state, the rotation format selection tab 42a and the unlimited format selection tab 42b are displayed as the format selection tabs 42 on the battle format selection screen, as shown in FIG. 12A. On the other hand, in the prerelease state, the rotation format selection tab 42a, the unlimited format selection tab 42b, and the prerotation format selection tab 42c are displayed as the format selection tabs 42 on the battle format selection screen, as shown in FIG. 12B.

By tapping one of the format selection tabs 42, the player can select the format of the card battle game to be played. Here, in the main release state, the prerotation format selection tab 42c is not displayed, as shown in FIG. 12A. Therefore, in the main release state, a card battle game using a deck for the prerotation format cannot be executed.

In addition, when one of the format selection tabs 42 is tapped on the battle format selection screen, the deck selection screen shown in FIG. 12C is displayed. On this deck selection screen, only decks for the format selected by the player are displayed. Also, when one of the decks displayed on the deck selection screen is tapped, a deck confirmation tab 54a and a determination tab 54b are displayed. When the deck confirmation tab 54a is tapped, a deck confirmation screen (not shown in the figure) is displayed. On this deck confirmation screen, all cards constituting the deck selected by the player are displayed. On the other hand, when the determination tab 54b is tapped, a card battle game using the selected deck is started.

Figure 13:
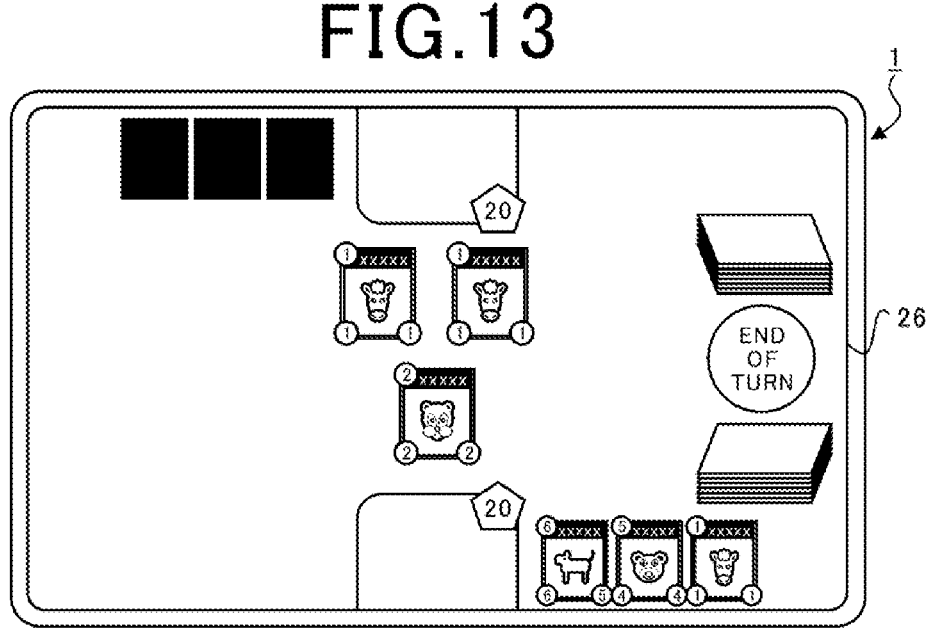
FIG. 13 is a drawing for illustrating an example of a card battle game.

FIG. 13 is a drawing for illustrating an example of the card battle game. The card battle game according to this embodiment is a two-player game, and cards to serve as the player's hand are randomly distributed from the deck selected by the player. Similarly, cards to serve as the opponent's hand are also randomly distributed to the opponent from the deck selected by the opponent. In addition, in the card battle game, the player's turn and the opponent's turn are alternately repeated. In each turn, a card randomly selected from the deck is added to the hand. In his/her own turn, the player lays a basic card on the table by selecting the basic card from the player's own hand in accordance with a predetermined rule, produces a predetermined effect by using a skill card, etc.

Note that available points are set in each turn, and each of the cards has a consumption value set therein. When the player lays a card on the table or uses a card, the consumption value set in the card is subtracted from the available points. The player can use, etc. cards in hand within the range of the available points.

In addition to the consumption value, two function values, i.e., attacking power and physical power, are further set in the basic card. The attacking power represents a damage value given to the opponent, and the physical power represents a damage suffering value indicating the power remaining until the relevant card is destroyed. In the card battle game, a life value (here, 20) is imparted to each of the player and the opponent, and the player or the opponent, whoever has first caused the life value of the competitor to be 0, is the winner.

FIG. 14A is a drawing for illustrating an example of function information for the ninth term. FIG. 14B is a drawing for illustrating an example of function information for the prerelease state in the tenth term. FIG. 14C is a drawing for illustrating an example of function information for the tenth term. In the card battle game, the progress of the game, such as the display of cards and calculation of a damage value when a card is used, is made on the basis of function information. When cards are to be displayed on the above-described deck organization screen, etc., display control, such as display of patterns and function values, is also performed on the basis of function information.

The function information stores all information about each card. As an example, one card ID is associated with: a card classification ID for identifying the card classification; the name of the card; illustration information indicated on the card; function values (consumption value, attacking power, physical power, special ability); and organizable number indicating the upper limit number of cards that can be organized in one deck.

For example, in the main release state in the ninth term, the function information for the ninth term is stored in the player terminal 1 and the server 100, as shown in FIG. 14A. This function information for the ninth term stores the above-described information about all cards belonging to the first to ninth card classifications, i.e., all cards provided in the ninth term. Also, in the main release state in the ninth term, the progress of a card battle game with the rotation format and the unlimited format is controlled with reference to the function information for the ninth term shown in FIG. 14A.

Also, when the distribution period is the tenth term, the function information for the prerelease state in the tenth term shown in FIG. 14B is stored in the player terminal 1 and the server 100 while the function information for the ninth term is retained. That is, in the prerelease state in the tenth term, two kinds of function information, i.e., one for the ninth term and the other for the prerelease state in the tenth term, are stored. Also, in the prerelease state in the tenth term, the progress of a card battle game with the prerotation format is controlled with reference to the function information for the prerelease state in the tenth term shown in FIG. 14B, and the progress of a card battle game with the rotation format and the unlimited format is controlled with reference to the function information for the ninth term shown in FIG. 14A.

Here, as indicated by bold line boxes in FIG. 14B, some of the function values set in a card as function information for the ninth term differ from the corresponding function values set in the same card as function information for the prerelease state in the tenth term. More specifically, in the prerelease state in the tenth term, a plurality of items of function information are stored, including: the function information for the ninth term in which the functions implemented by cards in a card battle game with the rotation format are associated with respective cards; and the function information for the prerelease state in the tenth term in which the functions implemented by cards in a card battle game with the prerotation format are associated with respective cards. Also, the cards include particular cards, which correspond to both the game condition for the rotation format and the game condition for the prerotation format in the prerelease state in the tenth term and which are assigned functions that differ between the function information for the ninth term and the function information for the prerelease state in the tenth term.

The rotation format and the prerotation format with which a game can be played in the prerelease state in the tenth term differ in the cards available, i.e., constitute different game conditions. When the combination of cards that can be organized in a deck is changed, there is a risk that the functions of some cards become too strong or too weak. An optimal game environment can be provided by changing the functions of some such cards.

Also, when the prerelease state in the tenth term ends, the main release state starts after maintenance work. In the maintenance work between the prerelease state and the main release state in the tenth term, the function information for the ninth term is changed into function information for the tenth term, and the function information for the prerelease state in the tenth term is deleted in the server 100. In addition, the first time the player terminal 1 communicates with the server 100 after the main release state in the tenth term is entered, the function information is also changed in the player terminal 1 in the same manner as in the server 100.

Therefore, in the main release state in the tenth term, only the function information for the tenth term shown in FIG. 14C is stored in the player terminal 1 and the server 100. In the main release state in the tenth term, the progress of a card battle game with the rotation format and the unlimited format is controlled with reference to the function information for the tenth term shown in FIG. 14C.

Here, as indicated by bold lines boxes in FIG. 14C, functions of some cards in the function information for the prerelease state in the tenth term are changed in the function information for the tenth term. It should be noted, however, that such changes in function are not essential. Although, in this embodiment, the function information for the prerelease state in the same distribution period is deleted in the main release state, this function information for the prerelease state may be retained in the main release state, so that this function information for the prerelease state may be updated to new function information for the prerelease state when the distribution period is updated. In addition, although function information in the ninth term and the tenth term has been described here, the function information in the other distribution periods is also updated in the same manner as described above.

Processes in the player terminal 1 and the server 100 for realizing the above-described card battle game, as well as functional units for executing these processes, will be described below. Note that the following description focuses particularly on processes related to differences between the prerelease state and the main release state, and descriptions of other processes will be omitted.

(Functional Units of Player Terminal 1)

Figure 15:
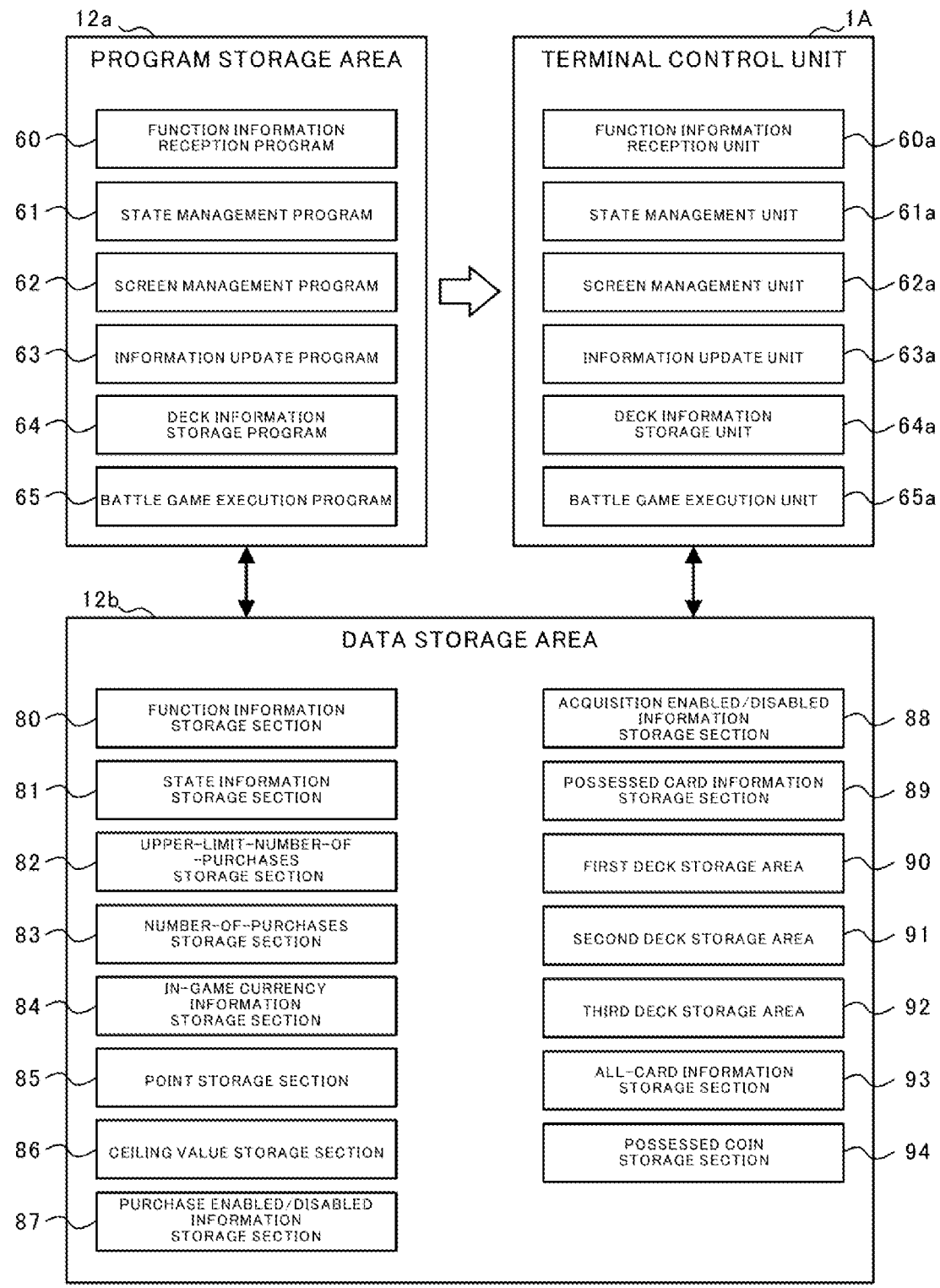
FIG. 15 is a functional block diagram of the player terminal.

FIG. 15 is a functional block diagram of the player terminal 1. A program storage area 12a and a data storage area 12b are provided in the memory 12 of the player terminal 1. When a game is started, the CPU 10 stores terminal-side game control programs (modules) in the program storage area 12a.

The terminal-side game control programs include a function information reception program 60, a state management program 61, a screen management program 62, an information update program 63, a deck information storage program 64, and a battle game execution program 65. Note that the programs listed in FIG. 15 are examples, and a large number of other programs are also provided as the terminal-side game control programs.

The CPU 10 runs the individual programs stored in the program storage area 12a and updates the data in the individual storage sections of the data storage area 12b. Furthermore, the CPU 10 runs the individual programs stored in the program storage area 12a, thereby causing the player terminal 1 (computer) to function as a terminal control unit 1A. The terminal control unit 1A includes a function information reception unit 60a, a state management unit 61a, a screen management unit 62a, an information update unit 63a, a deck information storage unit 64a, and a battle game execution unit 65a.

More specifically, the CPU 10 runs the function information reception program 60, thereby causing the computer to function as the function information reception unit 60a. Similarly, the CPU 10 runs the state management program 61, the screen management program 62, the information update program 63, the deck information storage program 64, and the battle game execution program 65, thereby causing the computer to function as the state management unit 61a, the screen management unit 62a, the information update unit 63a, the deck information storage unit 64a, and the battle game execution unit 65a, respectively.

In the data storage area 12b, a function information storage section 80, a state information storage section 81, an upper-limit-number-of-purchases storage section 82, a number-of-purchases storage section 83, an in-game currency information storage section 84, a point storage section 85, a ceiling value storage section 86, a purchase enabled/disabled information storage section 87, an acquisition enabled/disabled information storage section 88, a possessed card information storage section 89, a first deck storage area 90, a second deck storage area 91, a third deck storage area 92, an all-card information storage section 93, and a possessed coin storage section 94 are provided as storage sections for storing data. Note that these storage sections are examples, and a large number of other storage sections are provided in the data storage area 12b.

(Functional Units of Server 100)

Figure 16:
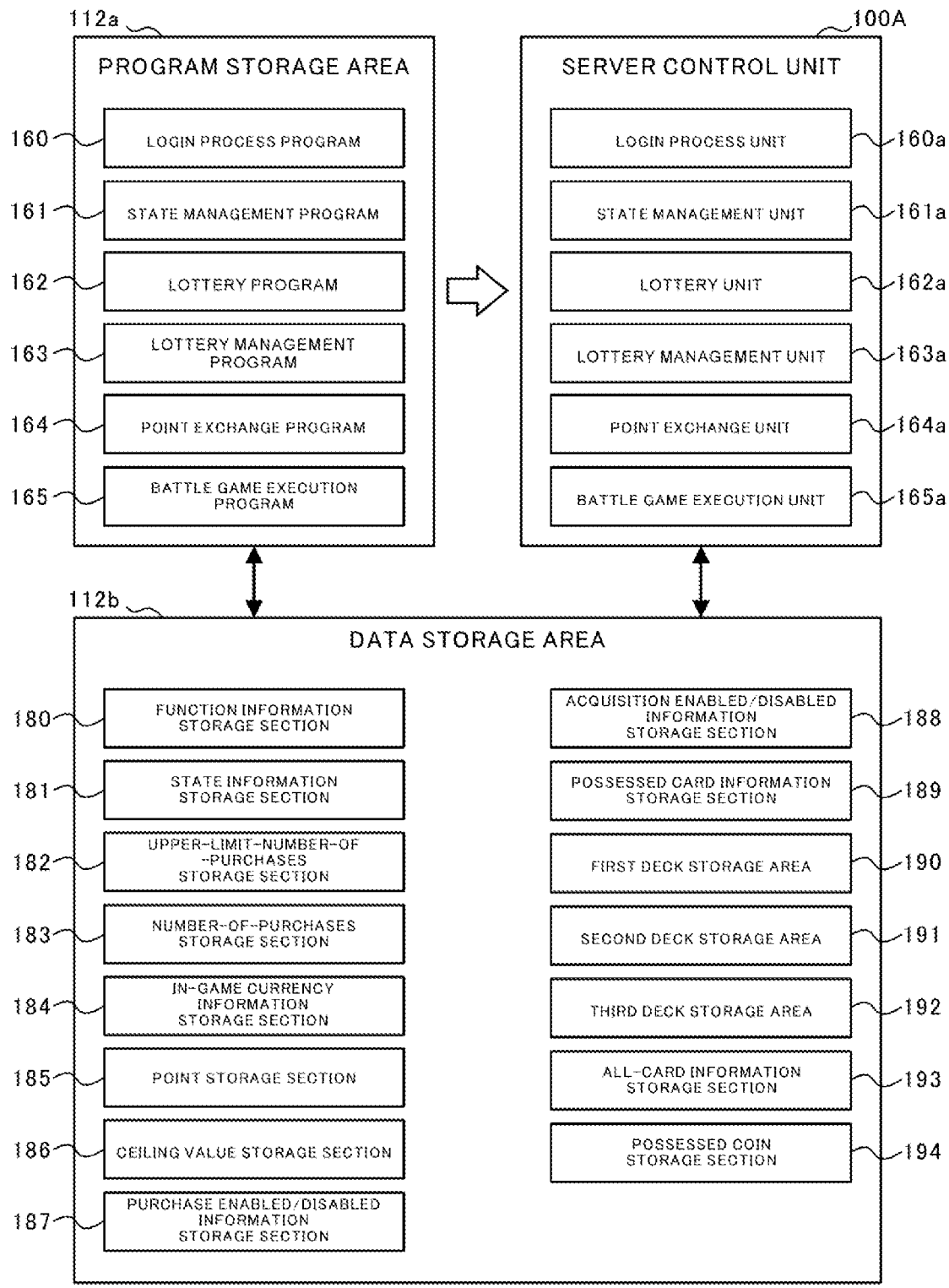
FIG. 16 is a functional block diagram of the server.

FIG. 16 is a functional block diagram of the server 100. A program storage area 112a and a data storage area 112b are provided in the memory 112 of the server 100. In the program storage area 112a, a login process program 160, a state management program 161, a lottery program 162, a lottery management program 163, a point exchange program 164, and a battle game execution program 165 are stored as server-side game control programs. Note that the programs listed in FIG. 16 are examples, and a large number of other programs are also provided as the server-side game control programs.

The CPU 110 runs the individual programs stored in the program storage area 112a and updates the data in the individual storage sections of the data storage area 112b. Furthermore, the CPU 110 runs the individual programs stored in the program storage area 112a, thereby causing the server 100 (computer) to function as a server control unit 100A. The server control unit 100A includes a login process unit 160a, a state management unit 161a, a lottery unit 162a, a lottery management unit 163a, a point exchange unit 164a, and a battle game execution unit 165a.

More specifically, the CPU 110 runs the login process program 160, thereby causing the computer to function as the login process unit 160a. Similarly, the CPU 110 runs the state management program 161, the lottery program 162, the lottery management program 163, the point exchange program 164, and the battle game execution program 165, thereby causing the computer to function as the state management unit 161a, the lottery unit 162a, the lottery management unit 163a, the point exchange unit 164a, and the battle game execution unit 165a, respectively.

In the data storage area 112b, a function information storage section 180, a state information storage section 181, an upper-limit-number-of-purchases storage section 182, a number-of-purchases storage section 183, an in-game currency information storage section 184, a point storage section 185, a ceiling value storage section 186, a purchase enabled/disabled information storage section 187, an acquisition enabled/disabled information storage section 188, a possessed card information storage section 189, a first deck storage area 190, a second deck storage area 191, a third deck storage area 192, an all-card information storage section 193, and a possessed coin storage section 194 are provided as storage sections for storing data. Note that the above-described storage sections are examples, and a large number of other storage sections are provided in the data storage area 112b.

Thus, the same storage sections as those in the data storage area 12b of the player terminal 1 are provided in the data storage area 112b of the server 100, and, in this embodiment, all information stored in the data storage area 12b are also stored in the data storage area 112b. Processes executed by the above-described terminal control unit 1A and server control unit 100A will be described below.

(Communication Processes Between Player Terminal 1 and Server 100)

Figure 17:
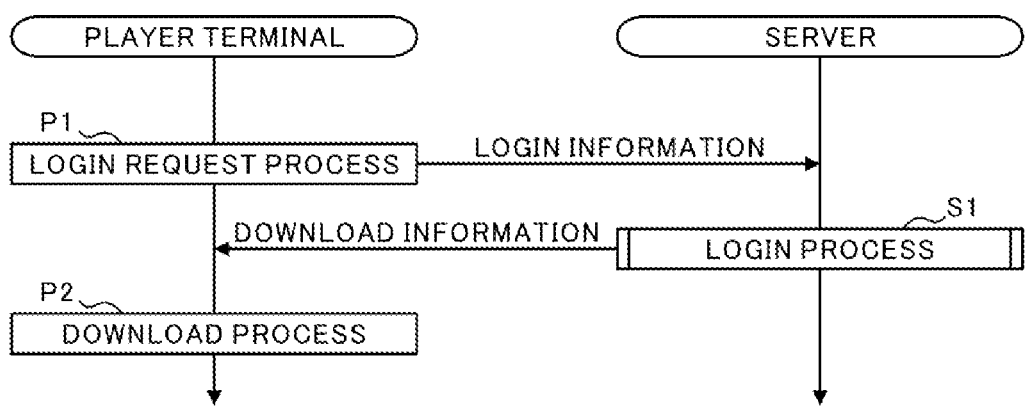
FIG. 17 is a first sequence diagram for illustrating processes in the player terminal and the server.

FIG. 17 is a first sequence diagram for illustrating processes in the player terminal 1 and the server 100. When an operation for starting a game is input by the player, the player terminal 1 executes a login request process. In this login request process, login information is transmitted to the server 100 (P1). Upon receiving the login information, the server 100 executes a login process (S1).

Figure 18:
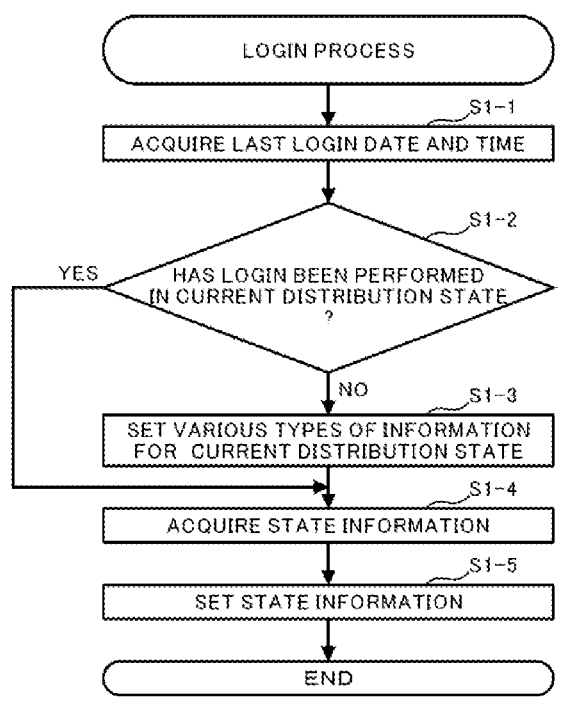
FIG. 18 is a flowchart for illustrating an example of a login process in the server.

FIG. 18 is a flowchart for illustrating an example of the login process (S1) in the server 100. Upon receiving the login information, the login process unit 160a identifies the player terminal 1 and acquires the last login date and time (S1-1). Also, the login process unit 160a determines whether or not a login has been performed in a distribution state (prerelease state or main release state) in the current distribution period (S1-2). If no login has been performed (NO in S1-2), the login process unit 160a sets various types of information for the current distribution state as download information (S1-3). Here, the download destination of function information corresponding to the current distribution state is set.

In addition, the login process unit 160a acquires, from the state information storage section 181, state information that is updated by the state management unit 161a on the basis of the date and time (S1-4) and sets the acquired state information as the download information (S1-5). Note that the state information is information configured so as to be capable of identifying the current distribution period and one of the three distribution states (i.e., the prerelease state, the transition state, and the main release state), such as the prerelease state in the n-th term, the transition state in the n-th term, and the main release state in the n-th term.

Referring back to FIG. 17, when the above-described login process (S1) is executed, the player terminal 1 acquires download information indicating the download destination of information, such as various types of data and programs, for executing the game and downloads various types of information to the player terminal 1 on the basis of the acquired download information (P2). By doing so, the first time a login is performed after the distribution period or the distribution state is updated, various types of information are updated in the player terminal 1. In addition, the first time a login is performed, the function information reception unit 60a downloads function information corresponding to the current distribution state and stores the downloaded function information in the function information storage section 80, or deletes function information from the function information storage section 80.

In addition, here, the state management unit 61a receives the state information set in the server 100 and stores the received state information in the state information storage section 81. By doing so, it is possible to grasp the current distribution period and the distribution state in the player terminal 1.

Figure 19:
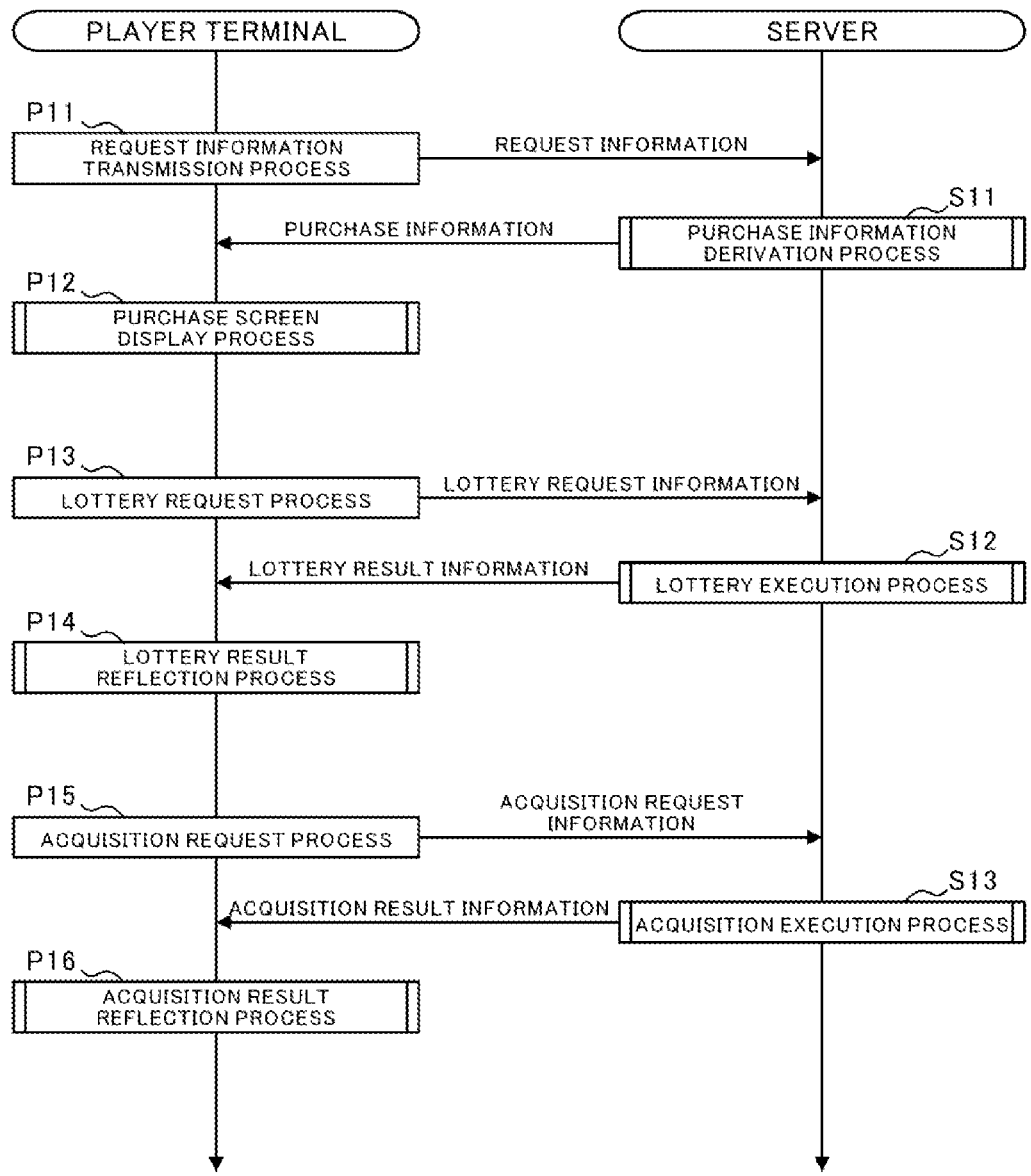
FIG. 19 is a second sequence diagram for illustrating processes in the player terminal and the server.

FIG. 19 is a second sequence diagram for illustrating processes in the player terminal 1 and the server 100. When the card purchase tab 32 (refer to FIG. 4A) is tapped in the player terminal 1, the terminal control unit 1A executes a request information transmission process (P11) for transmitting request information to the server 100. Upon receiving request information, the server 100 executes a purchase information derivation process (S11).

Figure 20:
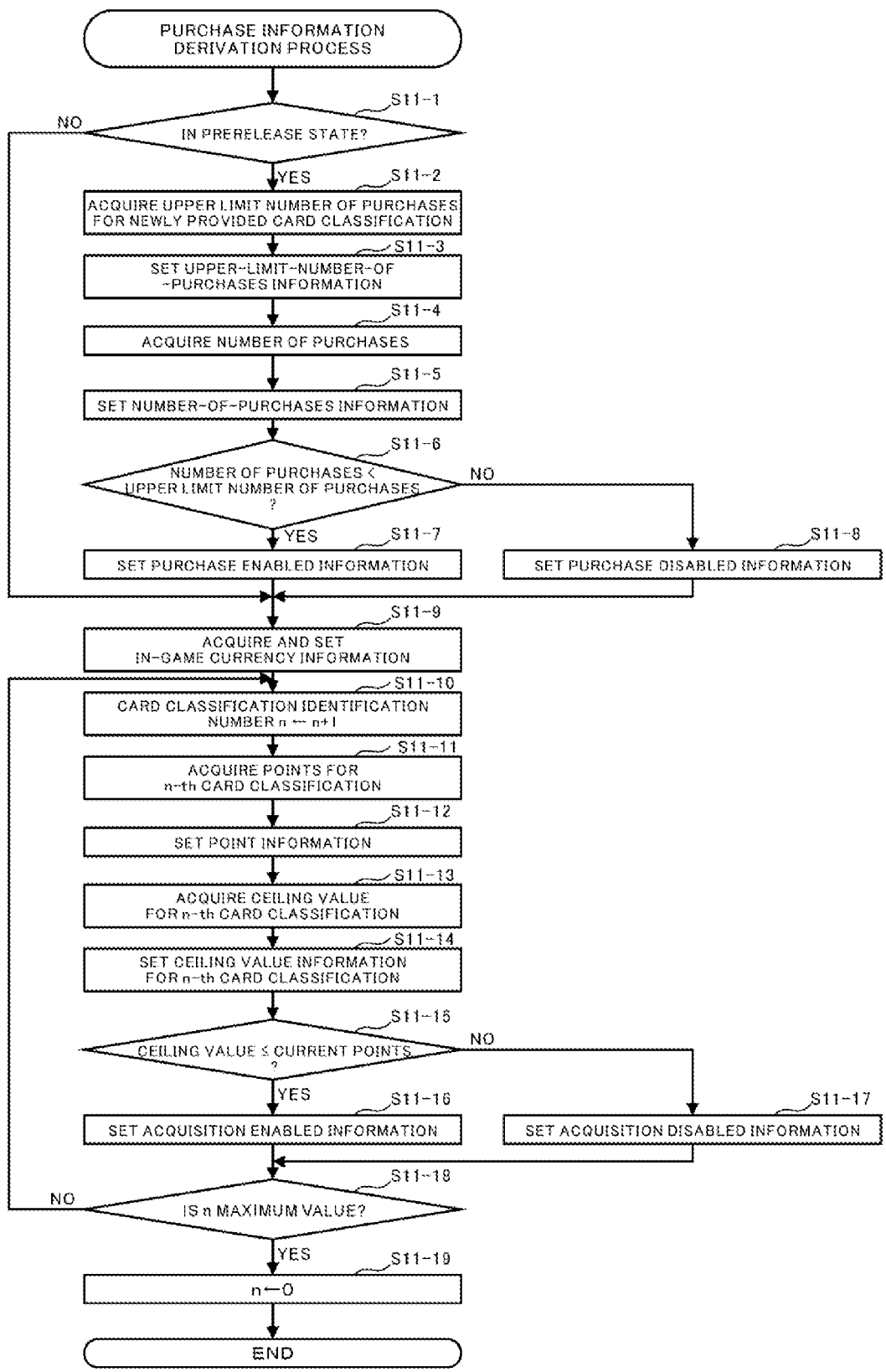
FIG. 20 is a flowchart for illustrating an example of a purchase information derivation process in the server.

FIG. 20 is a flowchart for illustrating an example of the purchase information derivation process (S11) in the server 100. Upon receiving the request information, the server control unit 100A determines whether or not the distribution state is the prerelease state (S11-1). If the distribution state is the prerelease state (YES in S11-1), the server control unit 100A acquires the upper limit number of purchases of a card pack for the new card classification in the current distribution period, i.e., the upper limit number of purchases stored in the upper-limit-number-of-purchases storage section 182 (S11-2), and sets the upper-limit-number-of-purchases information (S11-3). In addition, the server control unit 100A acquires the number of purchases of a card pack (the number of purchased card packs) for the new card classification in the current distribution period, i.e., the number of purchases stored in the number-of-purchases storage section 183 (S11-4) and sets the number-of-purchases information (S11-5).

Then, in the case where the number of purchases is less than the upper limit number of purchases (YES in S11-6), the server control unit 100A sets purchase enabled information indicating that purchase is possible (S11-7). In the case where the number of purchases is not less than the upper limit number of purchases (NO in S11-6), the server control unit 100A sets purchase disabled information indicating that purchase is not possible (S11-8).

In addition, regardless of whether or not the distribution state is the prerelease state, the server control unit 100A acquires in-game currency information (numbers of tickets, rupees, and diamonds) stored in the in-game currency information storage section 184 and sets the acquired in-game currency information (S11-9). In addition, the server control unit 100A increments a card classification identification number n (S11-10), acquires the points for the n-th card classification corresponding to the card classification identification number n, i.e., the points stored in the point storage section 185 (S11-11), and sets the acquired points (S11-12).

In addition, the server control unit 100A acquires the ceiling value for the n-th card classification corresponding to the card classification identification number n, i.e., the ceiling value stored in the ceiling value storage section 186 (S11-13), and sets the acquired ceiling value (S11-14). Then, in the case where the current points are equal to or larger than the ceiling value (YES in S11-15), the server control unit 100A sets acquisition enabled information indicating that a card can be acquired by using points (S11-16). In the case where the current points are not equal to or larger than the ceiling value (NO in S11-15), the server control unit 100A sets acquisition disabled information indicating that no cards can be acquired by using points (S11-17).

In the case where the card classification identification number n is the maximum value (YES in S11-18), the server control unit 100A sets the card classification identification number n to 0 (S11-19) and ends the purchase information derivation process. On the other hand, in the case where the card classification identification number n is not the maximum value (NO in S11-18), the server control unit 100A repeats the processing from step S11-10 above. By doing so, the point information, the ceiling value information, and the acquisition enabled information or the acquisition disabled information are set for all of the currently provided card classifications. Each of the items of information set in the above-described purchase information derivation process is received as purchase information in a purchase screen display process (P12) executed in the player terminal 1, as shown in FIG. 19.

Figure 21:
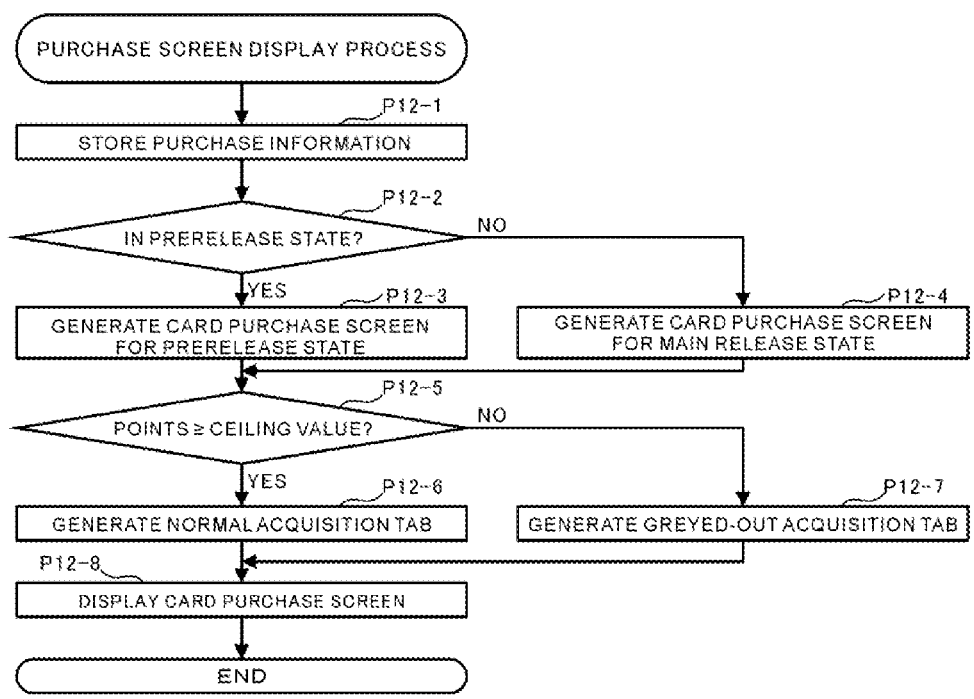
FIG. 21 is a flowchart for illustrating an example of a purchase screen display process in the player terminal.

FIG. 21 is a flowchart for illustrating an example of the purchase screen display process (P12) in the player terminal 1. The information update unit 63a stores the received purchase information (P12-1). Here, the information update unit 63a stores the upper limit number of purchases in the upper-limit-number-of-purchases storage section 82, stores the number of purchases in the number-of-purchases storage section 83, stores the numbers of tickets, rupees, and diamonds in the in-game currency information storage section 84, stores points for each card classification in the point storage section 85, stores the ceiling value for each card classification in the ceiling value storage section 86, stores, in the purchase enabled/disabled information storage section 87, purchase enabled information or purchase disabled information received as the purchase information, and stores, in the acquisition enabled/disabled information storage section 88, acquisition enabled information or acquisition disabled information received as the purchase information.

Then, the state information in the state information storage section 81 is checked, and if the current distribution state is the prerelease state (YES in P12-2), the screen management unit 62a generates a card purchase screen for the prerelease state (refer to FIG. 4B) (P12-3). Here, for the new card classification, purchase is allowed only by using tickets or diamonds, and furthermore, a screen displaying the upper limit number of purchases and the number of purchases is generated. At this time, if the number of purchases reaches the upper limit number of purchases, a card purchase screen that also disables purchase by using tickets and diamonds is generated.

On the other hand, if the current distribution state is not the prerelease state (NO in P12-2), the screen management unit 62a generates a card purchase screen for the main release state (refer to FIG. 5A) (P12-4). Here, a card purchase screen that allows purchase by using tickets, rupees, and diamonds is generated. In addition, in the case where the points corresponding to the new card classification in the current distribution period are equal to or larger than the ceiling value (YES in P12-5), the screen management unit 62a generates an acquisition tab in normal display (refer to FIG. 4D) that allows a tap operation in the points information field 36d (P12-6).

On the other hand, in the case where the points corresponding to the new card classification in the current distribution period are not equal to or larger than the ceiling value (NO in P12-5), the screen management unit 62a generates a greyed-out acquisition tab (refer to FIG. 4B) that disables a tap operation in the points information field 36d (P12-7). Then, the screen management unit 62a displays the card purchase screen generated as described above on the display 26 (P12-8).

Here, when the card purchase screen is to be displayed, the ticket information field 36a, the rupee information field 36b, the diamond information field 36c, and the points information field 36d corresponding to the new card classification in the current distribution period are displayed on the display 26 as the top page of the card purchase screen. Although detailed descriptions are omitted, when each of the tabs in the card classification selection section 34 is tapped, the ticket information field 36a, the rupee information field 36b, the diamond information field 36c, and the points information field 36d corresponding to the card classification of the tapped tab are displayed on the display 26.

Referring back to FIG. 19, when a purchase tab is tapped on the card purchase screen, the terminal control unit 1A executes a lottery request process (P13) for transmitting lottery request information to the server 100. The lottery request information is configured to be capable of identifying the card classification, and lottery request information corresponding to the tab tapped in the card classification selection section 34 is transmitted to the server 100. Upon receiving the lottery request information, the server 100 executes a lottery execution process (S12).

Figure 22:
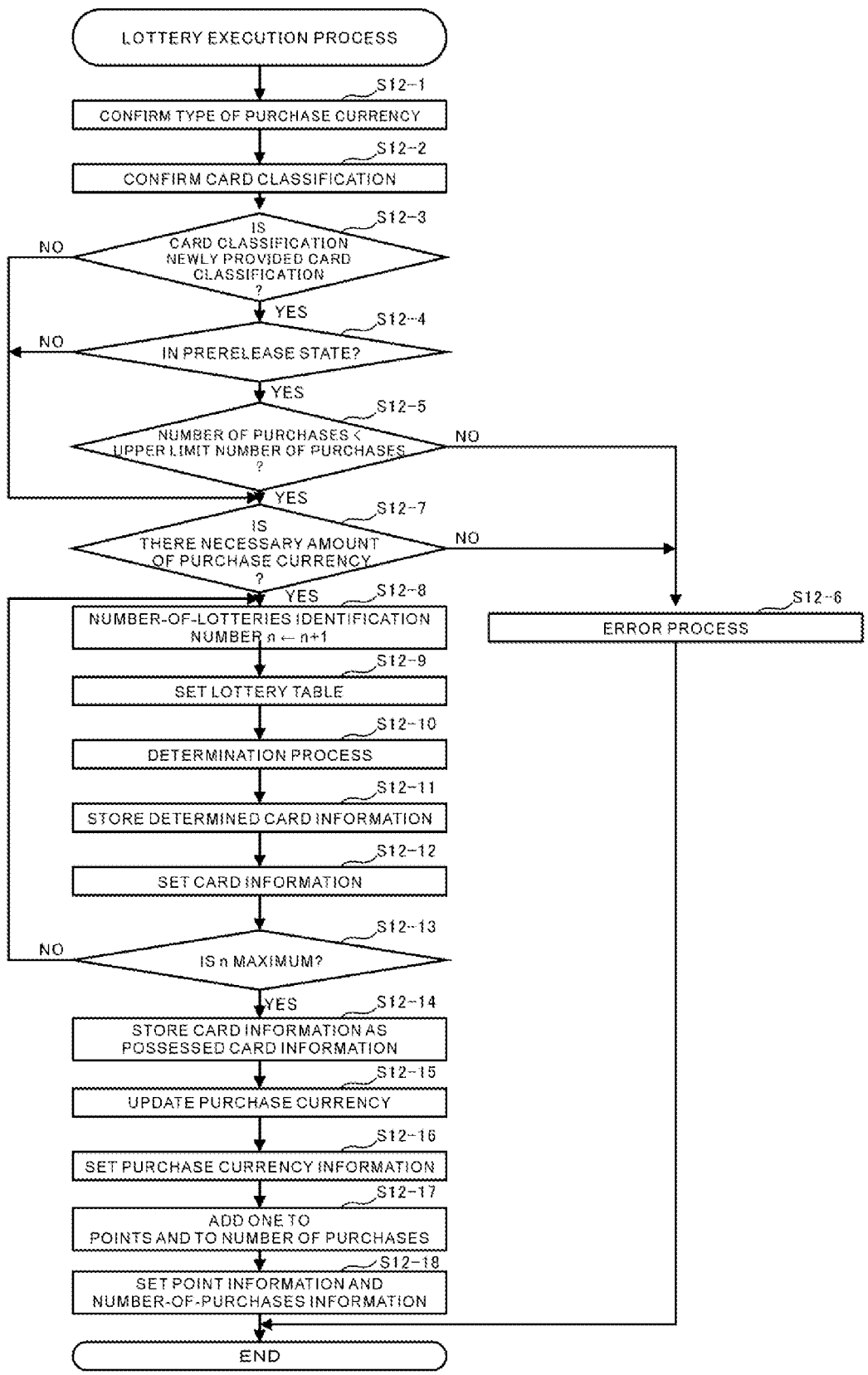
FIG. 22 is a flowchart for illustrating an example of a lottery execution process in the server.

FIG. 22 is a flowchart for illustrating an example of the lottery execution process (S12) in the server 100. Upon receiving the lottery request information, the lottery unit 162a confirms the type of the purchase currency (S12-1). Here, the type of the purchase currency is one of the in-game currencies among tickets, rupees, and diamonds. Next, the lottery management unit 163a confirms the card classification corresponding to the received lottery request information (S12-2). If the card classification is the new card classification in the current distribution period (YES in S12-3) and the current distribution state is the prerelease state (YES in S12-4), then it is determined whether or not the number of purchases is less than the upper limit number of purchases (S12-5).

If the number of purchases is not less than the upper limit number of purchases, i.e., if the number of purchases reaches the upper limit number of purchases (NO in S12-5), the lottery management unit 163a executes a predetermined error process (S12-6). In this case, purchasing a card, i.e., drawing a card, is not executed. In addition, the lottery management unit 163a also executes the error process (S12-6) in the case where the amount of purchase currency does not reach the needed amount (NO in S12-7), thereby not executing the drawing of a card.

If it is determined that the conditions for drawing cards are established in the above-described steps from S12-3 to S12-7, then the lottery unit 162a increments a number-of-lotteries identification number n (S12-8). Then, the lottery unit 162a sets a lottery table corresponding to both the card classification and the number-of-lotteries identification number (S12-9). Note that a lottery table is provided for each card classification, and winning rates are set for all cards belonging to the relevant card classification. The lottery unit 162a acquires a randomly generated random number value and executes a determination process for determining one of the cards on the basis of the acquired random number value and the lottery table (S12-10).

Then, the lottery unit 162a stores the card information about the card determined in the determination process (S12-11) and sets the relevant card information (S12-12). The card information set here is received by the player terminal 1. The lottery unit 162a determines whether or not the number-of-lotteries identification number n is the maximum (8, here) (S12-13), and if the number-of-lotteries identification number n is not the maximum (NO in S12-13), processing is repeated from step S12-8 described above.

In addition, if the number-of-lotteries identification number n is the maximum (YES in S12-13), the lottery unit 162a stores, in the possessed card information storage section 189, the eight items of card information stored in step S12-11 described above as possessed card information in association with the player ID (S12-14). Note that the possessed card information storage section 189 is configured to be capable of storing the possessed card information such that the number of possessed cards is associated with card information about each of the cards, and here, the number of possessed cards in the corresponding card information is updated.

In addition, the server control unit 100A updates the purchase currencies (tickets, rupees, and diamonds) used to purchase cards in the in-game currency information storage section 184 (S12-15) and sets the updated purchase currency information (S12-16). The purchase currency information set here is received by the player terminal 1.

In addition, the server control unit 100A adds one to the points stored in the point storage section 185 and adds one to the number of purchases stored in the number-of-purchases storage section 183 (S12-17). Note that, in the point storage section 185 and the number-of-purchases storage section 183, the points and the number of purchases are stored for each card classification. Then, the server control unit 100A sets point information indicating the updated points and number-of-purchases information indicating the updated number of purchases (S12-18). The point information and the number-of-purchases information set here are received by the player terminal 1.

Referring back to FIG. 19, when the lottery execution process (S12) is executed as described above, the player terminal 1 receives the above-described card information, purchase currency information, point information, and number-of-purchases information as the lottery result information. Upon receiving the lottery result information, the player terminal 1 executes a lottery result reflection process (P14).

Figure 23:
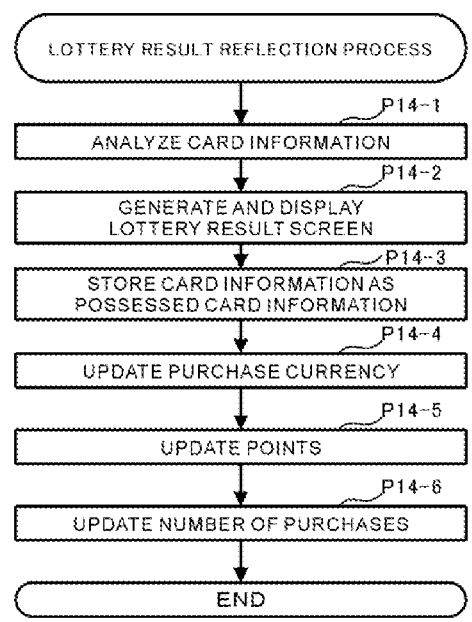
FIG. 23 is a flowchart for illustrating an example of a lottery result reflection process in the player terminal.

FIG. 23 is a flowchart for illustrating an example of the lottery result reflection process in the player terminal 1. Upon receiving the lottery result information, the screen management unit 62a analyzes the card information received as the lottery result information (P14-1) and generates and displays a lottery result screen (refer to FIG. 5B) (P14-2). In addition, on the basis of the results of analysis of the card information, the information update unit 63a stores the received card information in the possessed card information storage section 89 as the possessed card information (P14-3). Note that the possessed card information storage section 89 is configured to be capable of storing the possessed card information such that the number of possessed cards is associated with card information about each of the cards, and here, the number of possessed cards in the corresponding card information is updated.

Then, the information update unit 63a updates the numbers in the purchase currency information (tickets, rupees, and diamonds) in the in-game currency information storage section 84 on the basis of the purchase currency information received as the lottery result information (P14-4) and updates the points in the point storage section 85 on the basis of the point information (P14-5). In addition, on the basis of the number-of-purchases information, the information update unit 63a updates the number of purchases stored in the number-of-purchases storage section 83 (P14-6). By doing so, information is shared among the player terminal 1 and the server 100.

Referring back to FIG. 19, when the acquisition tab is tapped on the card purchase screen, the terminal control unit 1A executes an acquisition request process (P15). In the acquisition request process, cards that can be exchanged with points are displayed, and when the player selects a card to be exchanged with points, acquisition request information is transmitted to the server 100. The acquisition request information is configured to be capable of identifying the card classification ID and the card ID of the card. Upon receiving the acquisition request information, the server 100 executes an acquisition execution process (S13).

Figure 24:
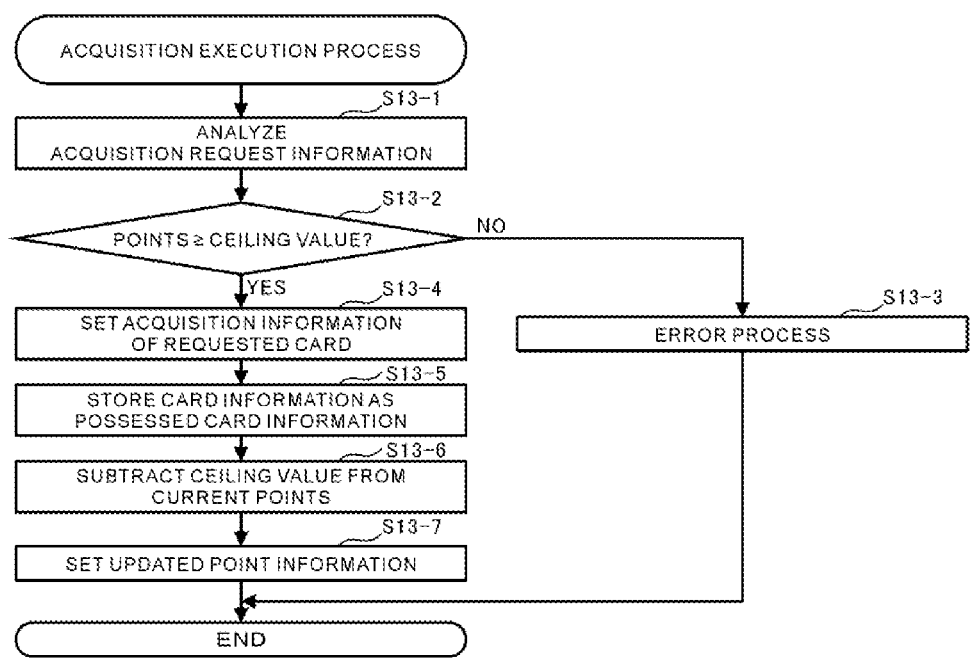
FIG. 24 is a flowchart for illustrating an example of an acquisition execution process in the server.

FIG. 24 is a flowchart for illustrating an example of the acquisition execution process (S13) in the server 100. Upon receiving the acquisition request information, the point exchange unit 164a analyzes the received acquisition request information (S13-1) and determines whether or not, of the points stored in the point storage section 185, the points for the card classification indicated in the acquisition request information are equal to or larger than the ceiling value (300) (S13-2). If the points stored in the point storage section 185 are not equal to or larger than the ceiling value (NO in S13-2), the point exchange unit 164a executes an error process (S13-3).

On the other hand, if the points stored in the point storage section 185 are equal to or larger than the ceiling value (YES in S13-2), the point exchange unit 164a sets acquisition information indicating acquisition of the card indicated in the acquisition request information (S13-4). Then, the server control unit 100A stores card information about the acquired card as the possessed card information (S13-5). In addition, the point exchange unit 164a subtracts the ceiling value (300) from the points stored in the point storage section 185 (S13-6) and sets the updated point information (S13-7).

Referring back to FIG. 19, when the acquisition execution process (S13) is executed as described above, the player terminal 1 receives the above-described acquisition information and point information as acquisition result information. Upon receiving the acquisition result information, the player terminal 1 executes an acquisition result reflection process (P16).

Figure 25:
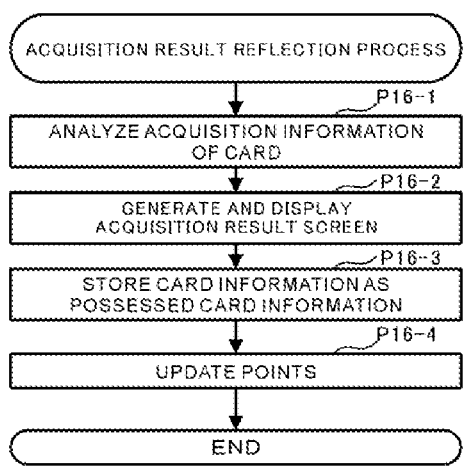
FIG. 25 is a flowchart for illustrating an example of an acquisition result reflection process in the player terminal.

FIG. 25 is a flowchart for illustrating an example of the acquisition result reflection process (P16) in the player terminal 1. Upon receiving the acquisition result information, the screen management unit 62a analyzes the acquisition information received as the acquisition result information (P16-1) and generates and displays an acquisition result screen (P16-2). In addition, on the basis of results of analysis of the acquisition information, the information update unit 63a stores, in the possessed card information storage section 89, card information indicated in the received acquisition information as the possessed card information (increases the number of possessed cards) (P16-3). In addition, on the basis of the point information received as the acquisition result information, the information update unit 63a updates the points stored in the point storage section 85 (P16-4).

Figure 26:
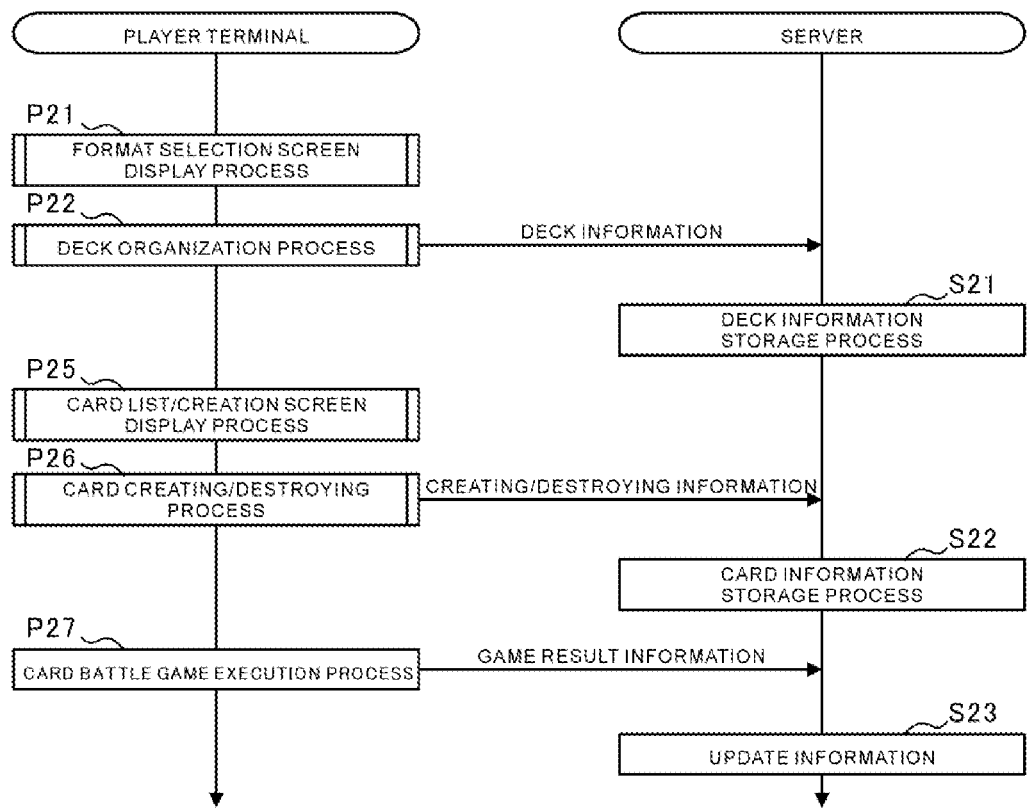
FIG. 26 is a third sequence diagram for illustrating processes in the player terminal and the server.

FIG. 26 is a third sequence diagram for illustrating processes in the player terminal 1 and the server 100. When the deck organization tab 40a (refer to FIG. 6A) is tapped in the player terminal 1, the screen management unit 62a executes a format selection screen display process (P21).

Figure 27:
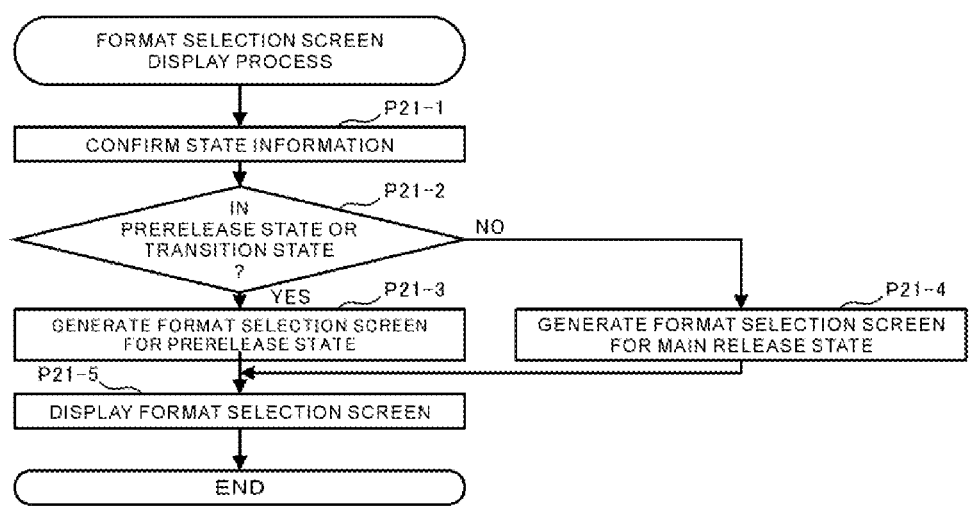
FIG. 27 is a flowchart for illustrating an example of a format selection screen display process in the player terminal.

FIG. 27 is a flowchart for illustrating an example of the format selection screen display process (P21) in the player terminal 1. The screen management unit 62a confirms the state information stored in the state information storage section 81 (P21-1). Then, if the current distribution state is the prerelease state or the transition state (YES in P21-2), the screen management unit 62a generates a format selection screen for the prerelease state (refer to FIG. 6B) (P21-3) and displays the generated format selection screen on the display 26 (P21-5). The screen management unit 62a generates the rotation format selection tab 42a, the unlimited format selection tab 42b, and the prerotation format selection tab 42c on the format selection screen for the prerelease state.

On the other hand, if the distribution state is not the prerelease state or the transition state (NO in P21-2), the screen management unit 62a generates a format selection screen for the main release state (refer to FIG. 9A) (P21-4) and displays the generated format selection screen on the display 26 (P21-5). The screen management unit 62a generates the rotation format selection tab 42a and the unlimited format selection tab 42b on the format selection screen for the main release state.

Referring back to FIG. 26, when the format selection screen is displayed as described above, a deck organization process (P22) is executed in the player terminal 1. Note that descriptions of processes related to the unlimited format will be omitted below.

Figure 28:
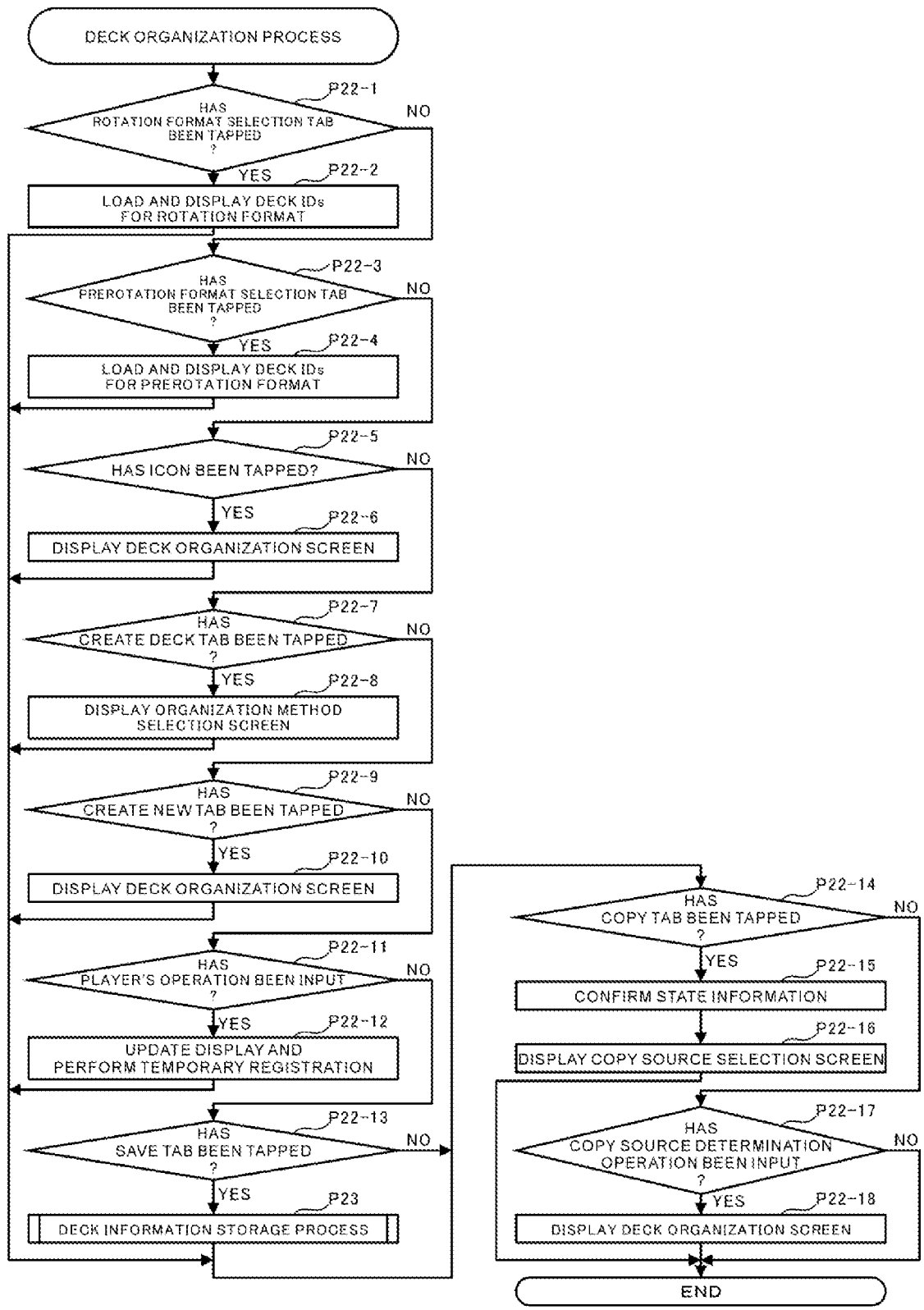
FIG. 28 is a flowchart for illustrating an example of a deck organization process in the player terminal.

FIG. 28 is a flowchart for illustrating an example of the deck organization process (P22) in the player terminal 1. When the rotation format selection tab 42a is tapped (YES in P22-1), the screen management unit 62a loads the deck IDs stored in the first deck storage area 90 and displays a deck selection screen (refer to FIG. 8B) on the basis of the loaded deck IDs (P22-2). In addition, when the prerotation format selection tab 42c is tapped on the deck selection screen (YES in P22-3), the screen management unit 62a loads the deck IDs stored in the second deck storage area 91 and displays a deck selection screen (refer to FIG. 6C) on the basis of the loaded deck IDs (P22-4).

Note that: the first deck storage area 90 stores deck information for the rotation format in the current distribution period; the second deck storage area 91 stores deck information for the prerotation format in the current distribution period; and the third deck storage area 92 stores deck information for the unlimited format. Therefore, decks for the rotation format are displayed on the deck selection screen in step P22-2 described above, and decks for the prerotation format are displayed on the deck selection screen in step P22-4 described above.

In addition, when an icon (deck) is tapped on the deck selection screen (YES in P22-5), the screen management unit 62a displays the deck organization screen (refer to FIG. 7C) (P22-6). Here, the screen management unit 62a loads the card information (card group information) that is associated with the deck ID corresponding to the tapped icon and that is stored in the first deck storage area 90, the second deck storage area 91, and the third deck storage area 92. Then, on the basis of the loaded card information, the screen management unit 62a displays the cards in the upper row on the deck organization screen.

In addition, when the create deck tab 44 is tapped on the deck selection screen (YES in P22-7), the screen management unit 62a displays the organization method selection screen (refer to FIG. 7A) (P22-8). In addition, when the create new tab 46a is tapped on the organization method selection screen (YES in P22-9), the screen management unit 62a loads, from the possessed card information storage section 89, the possessed cards corresponding to the currently selected format and displays a deck organization screen on which the possessed cards are arranged in the lower row (refer to FIG. 7B) (P22-10).

In addition, when the player's operation, such as sliding a card, is input on the deck organization screen (YES in P22-11), the screen management unit 62a updates the display, such as arranging the card in the upper row on the deck organization screen, and temporarily registers information about the card arranged in the upper row (P22-12).

In addition, when the save tab 48 is tapped (YES in P22-13), the deck information storage unit 64a executes a deck information storage process (P23).

Figure 29:
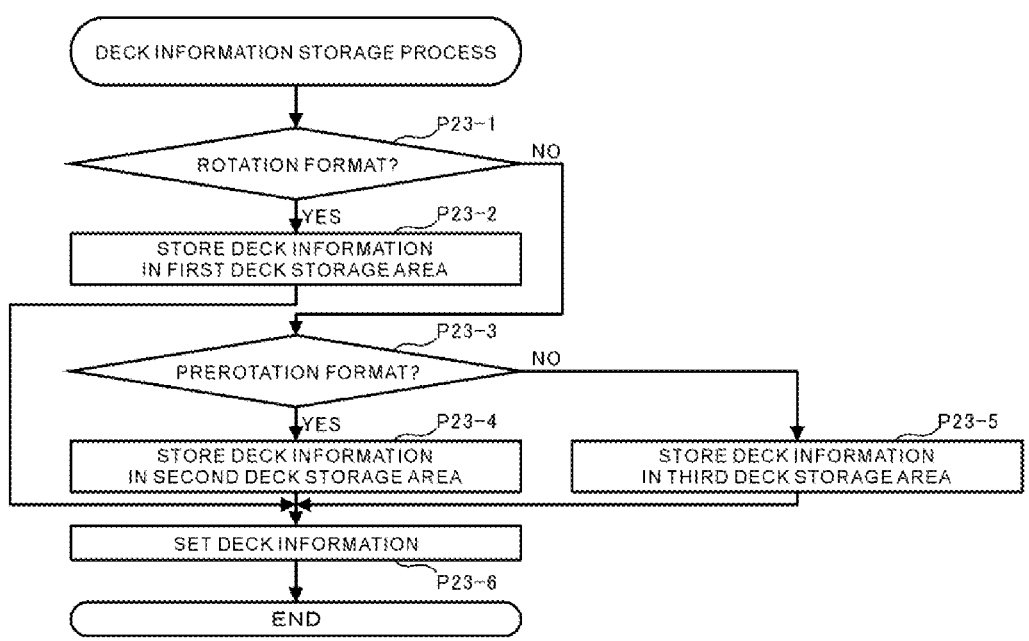
FIG. 29 is a flowchart for illustrating an example of a deck information storage process in the player terminal.

FIG. 29 is a flowchart for illustrating an example of the deck information storage process (P23) in the player terminal 1. If the format of the deck to be newly stored is the rotation format (YES in P23-1), the deck information storage unit 64a stores, in the first deck storage area 90, deck information including card information about all cards (card group information) selected (temporarily registered) on the deck organization screen (P23-2).

In addition, if the format of the deck to be newly stored is the prerotation format (YES in P23-3), the deck information storage unit 64a stores, in the second deck storage area 91, deck information including card information about all cards selected on the deck organization screen (P23-4). Note that if the format of the deck to be newly stored is the unlimited format (NO in P23-3), the deck information storage unit 64a stores, in the third deck storage area 92, deck information including card information about all cards selected on the deck organization screen (P23-5). Then, the deck information storage unit 64a sets the deck information stored in the above-described storage area (P23-6). The deck information set here is transmitted to the server 100.

Referring back to FIG. 28, when the copy tab 46b is tapped on the organization method selection screen (YES in P22-14), the screen management unit 62a confirms the state information stored in the state information storage section 81 (P22-15) and displays the copy source selection screen (refer to FIG. 7D) (P22-16).

Here, in the case where the current distribution state is the prerelease state and the format of the copy destination is the rotation format, the screen management unit 62a loads the deck IDs stored in the first deck storage area 90 and displays the copy source selection screen on the basis of the loaded deck IDs. In addition, in the case where the current distribution state is the prerelease state and the format of the copy destination is the prerotation format, the screen management unit 62a loads the deck IDs stored in the second deck storage area 91 and displays the copy source selection screen on the basis of the loaded deck IDs.

In addition, in the case where the current distribution state is the transition state and the format of the copy destination is the rotation format, the screen management unit 62a loads the deck IDs stored in the first deck storage area 90 and the second deck storage area 91 and displays the copy source selection screen on the basis of the loaded deck IDs.

In addition, in the case where the current distribution state is the main release state (except the transition state) and the format of the copy destination is the rotation format, the screen management unit 62a loads the deck IDs stored in the first deck storage area 90 and displays the copy source selection screen on the basis of the loaded deck IDs.

Then, when one of the icons is tapped on the copy source selection screen and a copy source determination operation for determining a deck to serve as the copy source is input (YES in P22-17), the deck information storage unit 64a displays the deck organization screen (refer to FIG. 7C) (P22-18). Here, the screen management unit 62a loads card information (card group information) associated with the deck ID corresponding to the tapped icon. Then, the screen management unit 62a displays cards in the upper row on the deck organization screen on the basis of the loaded card information.

According to the deck information storage process (P23) shown in FIG. 29, regarding a deck composed of cards selected from among the possessed cards on the basis of the player's operation in the prerelease state, deck information for the prerotation format (e.g., the sixth to tenth card classifications) is stored in the second deck storage area 91, and deck information for the rotation format (e.g., the fifth to ninth card classifications), which differs from the prerotation format, is stored in the first deck storage area 90. Then, in the maintenance work between the prerelease state and the transition state, the deck information stored in the first deck storage area 90 is deleted. In the transition state subsequent to the maintenance work, deck information corresponding to the rotation format (e.g., the sixth to tenth card classifications) is stored in the first deck storage area 90 on the basis of the player's operation.

In addition, according to the deck organization process (P22) shown in FIG. 28, deck information for the prerotation format (e.g., the sixth to tenth card classifications) stored in the second deck storage area 91 in the prerelease state can be copied into the first deck storage area 90 in the transition state on the basis of the player's operation.

Referring back to FIG. 26, when the deck information set in the deck organization process is transmitted from the player terminal 1 to the server 100, a deck information save process (S21) is executed in the server 100. Similarly to the player terminal 1, the server 100 is provided with the first deck storage area 190, the second deck storage area 191, and the third deck storage area 192. The deck information stored in the player terminal 1 is also stored in the storage areas of the server 100, in the same manner as in the player terminal 1.

In addition, when the card list/creation tab 40b (refer to FIG. 6A) is tapped on the player terminal 1, the screen management unit 62a executes a card list/creation screen display process (P25).

Figure 30:
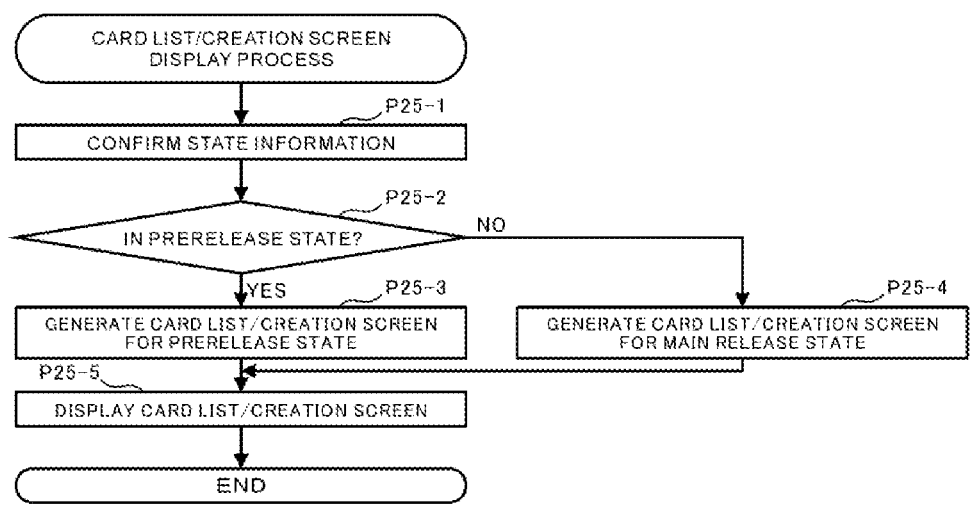
FIG. 30 is a flowchart for illustrating an example of a card list/creation screen display process in the player terminal.

FIG. 30 is a flowchart for illustrating an example of the card list/creation screen display process (P25) in the player terminal 1. The screen management unit 62a confirms the state information stored in the state information storage section 81 (P25-1). Then, if the current distribution state is the prerelease state (YES in P25-2), the screen management unit 62a generates a card list screen (refer to FIG. 10A) and a card creating screen (refer to FIG. 10B) for the prerelease state (P25-3) and displays the generated screens on the display 26 (P25-5).

Here, the screen management unit 62a loads possessed card information from the possessed card information storage section 89 and arranges all possessed cards on the card list screen. In addition, the screen management unit 62a loads card information about all the currently provided cards from the all-card information storage section 93, determines whether or not those cards are possessed by the player, and generates a card creating screen. Here, the card creating screen is generated and displayed such that, among the new cards in the current distribution period, cards not possessed by the player are displayed in a concealed manner, other old cards not possessed by the player are displayed in a greyed out manner, and possessed cards are displayed in color.

On the other hand, if the current distribution state is not the prerelease state (NO in P25-2), the screen management unit 62a generates a card list screen (refer to FIG. 11A) and a card creating screen (refer to FIG. 11B) for the main release state (P25-4) and displays the generated screens on the display 26 (P25-5). Here, the screen management unit 62a generates and displays a card creating screen such that cards not possessed by the player are displayed in a greyed out manner and possessed cards are displayed in color.

Referring back to FIG. 26, when the card list screen and the card creating screen are displayed as described above, a card creating/destroying process (P26) is executed in the player terminal 1.

Figure 31:
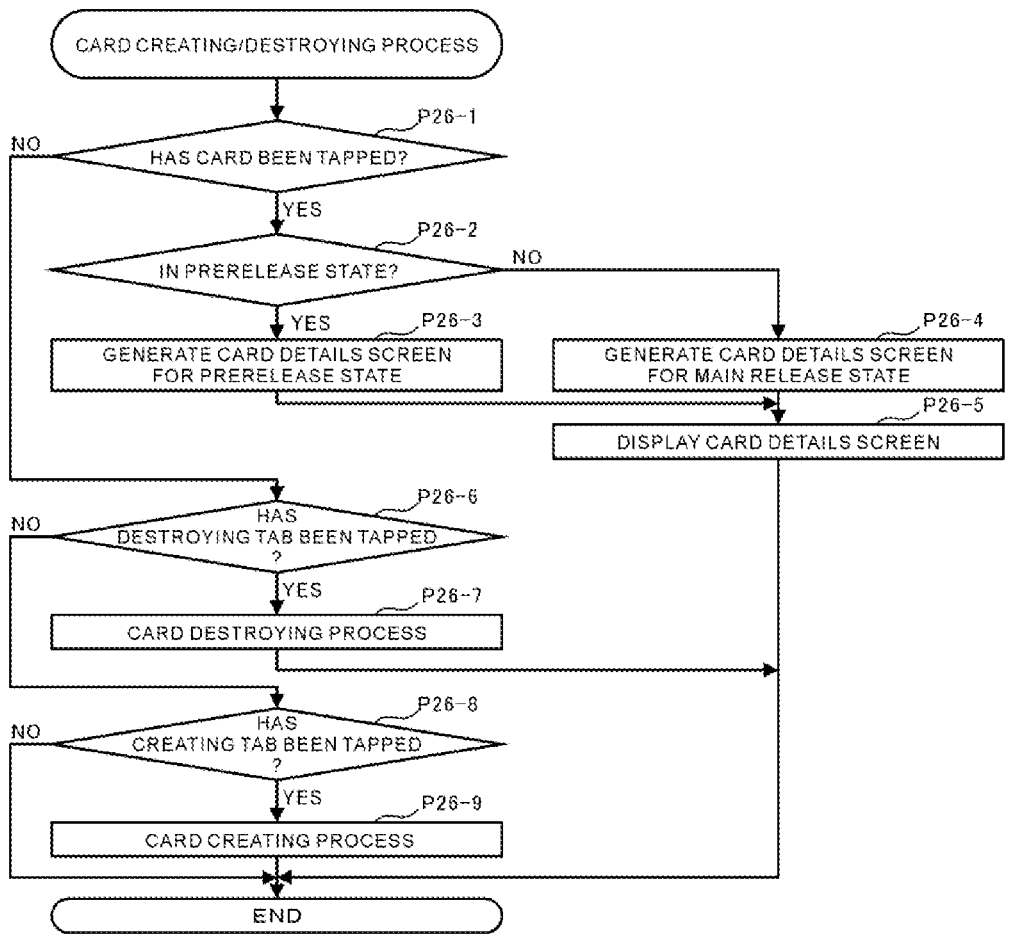
FIG. 31 is a flowchart for illustrating an example of a card creating/destroying process in the player terminal.

FIG. 31 is a flowchart for illustrating an example of the card creating/destroying process (P26) in the player terminal 1. When a card displayed on the card list screen or the card creating screen is tapped (YES in P26-1), the screen management unit 62a determines whether or not the current distribution state is the prerelease state (P26-2). Then, if the current distribution state is the prerelease state (YES in P26-2), the screen management unit 62a generates a card details screen for the prerelease state (refer to FIG. 10C) (P26-3) and displays the generated card details screen on the display 26 (P26-5).

Here, the screen management unit 62a loads the card information from the all-card information storage section 93 and generates a card details screen for the tapped card. At this time, the screen management unit 62a generates the card details screen so as to display the destroying tab 52a and the creating tab 52b in a greyed out manner in the case where the tapped card belongs to the new card classification in the current distribution period.

In addition, the screen management unit 62a generates the card details screen so as to display the destroying tab 52a in a greyed out manner in the case where the tapped card does not belong to the new card classification in the current distribution period and is not possessed by the player. Furthermore, the screen management unit 62a generates the card details screen so as to display the creating tab 52b in a greyed out manner in the case where the player does not possess the coins needed to create the tapped card.

On the other hand, if the current distribution state is not the prerelease state (NO in P26-2), the screen management unit 62a generates a card details screen for the main release state (refer to FIG. 11C) (P26-4) and displays the generated card details screen on the display 26 (P26-5). Here, the screen management unit 62a generates the card details screen so as to display the destroying tab 52a in a greyed out manner in the case where the player does not possess the tapped card and so as to display the creating tab 52b in a greyed out manner in the case where the player does not possess the coins needed to create the tapped card.

In addition, when the destroying tab 52a is tapped (YES in P26-6), a card destroying process (P26-7) is executed. In this card destroying process, the screen management unit 62a displays a destroying animation, and the information update unit 63a adds the number of coins corresponding to the destroyed card to the number of possessed coins stored in the possessed coin storage section 94. Furthermore, the information update unit 63a reduces the number of possessed cards corresponding to the destroyed card in the possessed card information stored in the possessed card information storage section 89.

In addition, when the creating tab 52b is tapped (YES in P26-8), a card creating process (P26-9) is executed. In this card creating process, the screen management unit 62a displays a creating animation, and the information update unit 63a subtracts the number of coins corresponding to the created card from the number of possessed coins stored in the possessed coin storage section 94. Furthermore, the information update unit 63a increases the number of possessed cards corresponding to the created card in the possessed card information storage section 89.

According to the above-described card creating/destroying process, the destroying tab 52a and the creating tab 52b are disabled from accepting a tap operation for a new card in the prerelease state, and the destroying tab 52a and the creating tab 52b are enabled for a tap operation after the start of the main release state (including the transition state).

Referring back to FIG. 26, when a card is created or destroyed in the card creating/destroying process (P26), creating/destroying information, such as card information about the created or destroyed card, the updated number of coins, and possessed card information, is transmitted from the player terminal 1 to the server 100. Upon receiving the creating/destroying information, the server 100 executes a card information storage process (S22) for updating information in the possessed card information storage section 189 and the possessed coin storage section 194, in the same manner as in the player terminal 1.

In addition, when the solo-play selection section 30b or the battle selection section 30c in the menu bar 30 is tapped, a screen for setting a game condition, such as the format, is displayed. For example, when a game condition is set after the solo-play selection section 30b is tapped, the battle game execution unit 65a executes a card battle game execution process (P27) by using the possessed cards stored in the possessed card information storage section 89.

In the prerelease state, the battle game execution unit 65a, on the basis of the player's operation, executes a game corresponding to the rotation format by using deck information stored in the first deck storage area 90 (fifth to ninth card classifications if the distribution period is the tenth term) and executes a game corresponding to the prerotation format by using deck information stored in the second deck storage area 91 (sixth to tenth card classifications if the distribution period is the tenth term). In addition, in the main release state (including the transition state), the battle game execution unit 65a, on the basis of the player's operation, executes a game corresponding to the rotation format having the same game condition as the prerotation format by using deck information stored in the first deck storage area 90 (sixth to tenth card classifications if the distribution period is the tenth term).

When the card battle game execution process ends, game result information is transmitted from the player terminal 1 to the server 100. The server 100 updates the data storage area 112b (S23) on the basis of the game result information received by the server control unit 100A. Although not described in detail, in the case where the battle selection section 30c is tapped, the battle game execution unit 65a in the player terminal 1 and the battle game execution unit 165a in the server 100 execute a card battle game in the form of a battle through communication via cooperative operation.

Although an aspect of the embodiment has been described with reference to the accompanying drawings, it is needless to say that the present invention is not limited to the embodiment described above. It is obvious that a person skilled in the art could conceive of various variations and modifications within the scope recited in the claims, and it will be understood that those variations and modifications naturally fall within the technical scope of the present invention.

In the above-described embodiment, when cards are to be purchased, a plurality of cards are purchased all at once as a card pack. More specifically, eight lottery processes are executed on the basis of one operation on a purchase tab (one lottery request operation). However, one lottery process may be executed with one lottery request operation.

In addition, in the above-described embodiment, each of the cards belongs to one of the card classifications. However, without any card classification being provided, one card may be determined among all the provided cards via a lottery process.

In addition, although each card belongs to one of the card classifications in the above-described embodiment, cards that do not belong to any card classification may be provided. In this case, for example, cards that do not belong to any card classification may be capable of being used with the rotation format in all periods or may be capable of being used with the rotation format only in a preset time period.

In addition, although the above-described embodiment has been described by way of an example where the execution of both a battle against the computer and a battle against another player through communication is enabled, it is possible that the execution of only one of the two types of battle is enabled. In addition, the specifics of the game in the above-described embodiment are merely examples. In the above-described embodiment, a card battle game in which a card is used as a game medium can be played. However, for example, a character may be provided as a game medium, whereby it is possible to achieve an action game or a role-playing game in which a battle game is executed by using possessed characters.

The specifics of the game are not particularly limited, as long as: a lottery process in which one of a plurality of kinds of game media provided in advance is determined by lottery on the basis of a lottery request operation input by the player is executed; the determined game medium is stored as a possessed game medium in a storage section in association with the player ID; and a predetermined game is executed by using the possessed game medium stored in the storage section.

In addition, the above-described embodiment has been described by way of an example where, in the player terminal 1 and the server 100: display content is changed on the basis of the current distribution period and distribution state; and predetermined operations are restricted depending on the display content for each of the distribution states. However, a different program may be read, for example, when the distribution period or the distribution state is updated, so that processes can be made to differ depending on the distribution period, etc. instead of determining the current distribution period, etc.

Specifically, a program including a process for restricting the execution of the lottery process if the limited number of times is exceeded may be read in the prerelease state, and a program in which a process for restricting the execution of the lottery process is not executed may be read in the main release state. In more detail, in the prerelease state, a program is read in which: the execution of the lottery process exceeding the limited number of times is restricted for a particular card classification; and execution of the lottery process exceeding the limited number of times is enabled for the card classifications other than the particular card classification. On the other hand, in the main release state, a program is read in which execution of the lottery process exceeding the limited number of times is enabled for all card classifications. Thus, in the prerelease state, the game may be executed by starting a program in which the execution of the lottery process is restricted, and in the main release state, the game may be executed by starting a program in which the execution of the lottery process is not restricted.

In addition, for example, a program for disabling the acceptance of an operation for creating a predetermined card (first operation) may be read in the prerelease state, and a program for enabling the acceptance of an operation for creating a predetermined card (first operation) may be read in the main release state.

In addition, in the above-described embodiment, the points do not reach the ceiling value in the prerelease state. However, for example, the points may also be allowed to reach the ceiling value in the prerelease state, though an operation for acquiring a card by using points (second operation) is not accepted in the prerelease state. In this case, for example, a program that does not accept the relevant operation (second operation) may be read in the prerelease state, and a program that can accept the relevant operation (second operation) may be read in the main release state.

In addition, for example: in the prerelease state, a program for storing, in a first storage area, first deck information (first medium group information) for identifying a plurality of cards that are selected from among the possessed cards (possessed game media) on the basis of the player's operation and that correspond to a first game condition and for storing, in a second storage area, second deck information (second medium group information) for identifying a plurality of cards that correspond to a second game condition different from the first game condition is read; and in the main release state, a program for storing the second deck information (second medium group information) in the first storage area on the basis of the player's operation is read.

Furthermore: in the prerelease state, a program that enables the execution of a game using the first deck information (first medium group information) stored in the first storage area and a game using the second deck information (second medium group information) stored in the second storage area on the basis of the player's operation may be read; and in the main release state, a program that enables the execution of a game using the second deck information (second medium group information) stored in the first storage area on the basis of the player's operation and disables the execution of a game using the first deck information (first medium group information) and that further stores (migrates, copies), into the first storage area, the second deck information (second medium group information) stored in the second storage area in the prerelease state on the basis of the player's operation may be read.

In addition, an update process during maintenance work may be programmed in advance so as to be automatically executed at a predetermined date and time, or alternatively, an update process may be manually executed.

In addition, although a ceiling value is set for the number of purchases of a card pack in the above-described embodiment, a ceiling value may be set for the number of purchases of a card. In addition, whether or not the ceiling value is reached may be managed on the basis of the number of times the lottery process is executed, instead of the number of purchases of a card pack.

In addition, although in the above-described embodiment, the lottery process can be executed without being restricted in the main release state, a limited number of times may be set within a range in which the lottery process can be executed a larger number of times in the main release state than in the prerelease state. In short, a larger limited number of times may be set in the main release state than in the prerelease state.

Note that, in the above-described embodiment, the information processing system S, which is a client-server system, executes each of the above-described information processes. However, the functions of the server 100 in the above-described embodiment may be provided in the player terminal 1. In this case, a communication function is not essential, and the player terminal 1 functions as a game terminal device.

In addition, the programs in the above-described embodiment may be stored in a computer-readable storage medium, and may be provided in the form of a storage medium. Furthermore, those programs may be provided in the form of a game terminal device or an information processing system including this storage medium. Furthermore, the embodiment described above may be an information processing method for realizing the functions and the steps shown in the flowcharts.

Note that the possessed card information storage section 89 and the possessed card information storage section 189 in the above-described embodiment correspond to a storage section, the server control unit 100A for executing processing in step S12-14 and the terminal control unit 1A for executing processing in step P14-3 correspond to a game medium storage unit, the prerelease state corresponds to a preliminary period, the transition state corresponds to a post period, the rotation format in the prerelease state in a predetermined distribution period corresponds to the first game condition, the deck corresponding to the first game condition corresponds to the first medium group information, the first deck storage area 90 corresponds to the first storage area, the prerotation format in the prerelease state in the predetermined distribution period or the rotation format in the main release state in the predetermined distribution period corresponds to the second game condition, the deck corresponding to the second game condition corresponds to the second medium group information, the second deck storage area 91 corresponds to the second storage area, the deck information storage unit 64a corresponds to a medium group information storage unit, the battle game execution units 65a and 165a correspond to a game executing unit, the terminal control unit 1A for executing processing in steps P22-14 to P22-18 corresponds to a transition unit, the function information storage sections 80 and 180 correspond to a function information storage section, function information corresponding to a card classification provided relatively earlier corresponds to first function information, and function information corresponding to a card classification provided relatively later corresponds to second function information.

What is claimed is:

1. An information processing system comprising configured to execute:
   a computer processor;
   a memory coupled to the computer processor, the memory comprising a program configured to perform a method comprising:
      executing a computer game on a first player terminal, wherein the first player terminal is communicatively connected to a server over a communication network, and wherein the computer game is administered by the server;
      storing, during the execution of the computer game, game media possessed by a player among a plurality of kinds of digital cards as a plurality of possessed digital cards that are associated with a player ID;

storing, during the execution of the computer game and in a first storage area in the memory in a preliminary distribution period before a prescribed time, first deck information for identifying a first plurality of digital cards corresponding to a first game condition and selected from among the plurality of possessed digital cards based on a first player's input operation in the computer game;

storing, during the execution of the computer game and in a second storage area in the memory in the preliminary distribution period, second deck information for identifying a second plurality of digital cards corresponding to a second game condition different from the first game condition;

storing, during the execution of the computer game and in the first storage area in a post distribution period after the prescribed time, the second deck information based on the first player's input operation in the computer game;

performing, through communication with the server in the preliminary distribution period and within the computer game, a first card battle game over the communication network and using the first deck information stored in the first storage area and a second card battle game using the second deck information stored in the second storage area based on the first player's input operation in the computer game;

performing, through communication with the server in the post distribution period and within the computer game, the second card battle game using the second deck information stored in the first storage area based on the first player's input operation in the computer game;

disabling, during the execution of the computer game in the post distribution period, a creation operation of digital cards in the computer game using the first deck information; and storing, during the execution of the computer game in the first storage area in the post distribution period, the second deck information stored in the second storage area in the preliminary distribution period based on the first player's input operation.

2. The information processing system according to claim 1, wherein the method further comprises:

storing a plurality of items of function information including first function information in which functions implemented by the first plurality of digital cards corresponding to at least the first game condition and second function information in which functions implemented by the second plurality of digital cards corresponding to at least the second game condition, wherein the first card battle game and the second card battle game proceed based on the plurality of items of the function information, and wherein the game media include a particular game medium that corresponds to both the first game condition and the second game condition and that is associated with a second function that differs between the first function information and the second function information.

3. An information processing method comprising:
executing a computer game on a first player terminal, wherein the first player terminal is communicatively connected to a server over a communication network, and wherein the computer game is administered by the server;

storing, during the execution of the computer game, game media possessed by a player among a plurality of kinds of digital cards as a plurality of possessed digital cards that are associated with a player ID;

storing, during the execution of the computer game and in a first storage area in a memory in a preliminary distribution period before a prescribed time, first deck information for identifying a first plurality of digital cards corresponding to a first game condition and selected from among the plurality of possessed digital cards based on a first player's input operation in the computer game;

storing, during the execution of the computer game and in a second storage area in the memory in the preliminary distribution period, second deck information for identifying a second plurality of digital cards corresponding to a second game condition different from the first game condition;

storing, during the execution of the computer game and in a post distribution period after the prescribed time, the second deck information in the first storage area based on the first player's input operation in the computer game;

performing, through communication with the server in the preliminary distribution period and within the computer game, a first card battle game over the communication network and using the first deck information stored in the first storage area and a second card battle game using the second deck information stored in the second storage area based on the first player's input operation in the computer game;

performing, through communication with the server in the post distribution period and within the computer game, the second card battle game using the second deck information stored in the first storage area based on the first player's input operation in the computer game;

disabling, during the execution of the computer game in the post distribution period, a creation operation of digital cards in the computer game using the first deck information; and storing, during the execution of the computer game in the first storage area in the post distribution period, the second deck information stored in the second storage area in the preliminary distribution period based on the first player's input operation.

4. A non-transitory computer readable medium storing a program causing a computer to performed a method comprising:

executing a computer game on a first player terminal, wherein the first player terminal is communicatively connected to a server over a communication network, and wherein the computer game is administered by the server;

storing, during the execution of the computer game, game media possessed by a player among a plurality of kinds of digital cards as a plurality of possessed digital cards that are associated with a player ID;

storing, during the execution of the computer game and in a first storage area in a memory in a preliminary distribution period before a prescribed time, first deck information for identifying a first plurality of digital cards corresponding to a first game condition and selected from among the plurality of possessed digital cards based on a first player's input operation in the computer game;

storing, during the execution of the computer game and in a second storage area in the memory in the preliminary distribution period, second deck information for identifying a second plurality of digital cards corresponding to a second game condition different from the first game condition;

storing, during the execution of the computer game and in a post distribution period after the prescribed time, the second deck information in the first storage area based on the first player's input operation in the computer game;

performing, through communication with the server in the preliminary distribution period and within the computer game, a first card battle game over the communication network and using the first deck information stored in the first storage area and a second card battle game using the second deck information stored in the second storage area based on the first player's input operation in the computer game;

performing, through communication with the server in the post distribution period and within the computer game, the second card battle game using the second deck information stored in the first storage area based on the first player's input operation in the computer game;

disabling, during the execution of the computer game in the post distribution period, a creation operation of digital cards in the computer game using the first deck information; and storing, during the execution of the computer game in the first storage area in the post distribution period, the second deck information stored in the second storage area in the preliminary distribution period based on the first player's input operation.

* * * * *